US012100057B1

(12) United States Patent
Le et al.

(10) Patent No.: US 12,100,057 B1
(45) Date of Patent: Sep. 24, 2024

(54) COMPUTER-AUTOMATED INTEGRATION WITH WEB-BASED ACCOUNTING SYSTEMS FOR IMPROVED DISPLAY AND PROCESSING OF INVOICES

(71) Applicant: Skyline Payment Systems, LLC, San Francisco, CA (US)

(72) Inventors: Phong Quang Le, Oakland, CA (US); Long Quang Le, Oakland, CA (US)

(73) Assignee: Skyline Payment Systems, LLC, San Francisco, CA (US)

(*) Notice: Subject to any disclaimer, the term of this patent is extended or adjusted under 35 U.S.C. 154(b) by 0 days.

(21) Appl. No.: 18/596,943

(22) Filed: Mar. 6, 2024

(51) Int. Cl.
*G06Q 40/12* (2023.01)
*G06Q 20/10* (2012.01)

(52) U.S. Cl.
CPC .......... *G06Q 40/12* (2013.12); *G06Q 20/102* (2013.01)

(58) Field of Classification Search
CPC .............................. G06Q 40/12; G06Q 20/102
See application file for complete search history.

(56) References Cited

U.S. PATENT DOCUMENTS

| | | |
|---|---|---|
| 6,507,826 B1 | 1/2003 | Maners |
| 8,073,777 B2 | 12/2011 | Barry |
| 10,410,274 B1 | 9/2019 | McEneny, Sr. |
| 2002/0091597 A1 | 7/2002 | Teng |
| 2009/0132405 A1 | 5/2009 | Scipioni |
| 2011/0208550 A1* | 8/2011 | Lamarche ............... G06Q 20/24 705/16 |
| 2018/0158116 A1* | 6/2018 | Hoang .................. G06Q 30/04 |
| 2020/0219187 A1 | 7/2020 | Zarrad |
| 2022/0383325 A1 | 12/2022 | Hoffman |

FOREIGN PATENT DOCUMENTS

CN 116051218 A 5/2023

* cited by examiner

*Primary Examiner* — Paul Danneman
(74) *Attorney, Agent, or Firm* — Blueshift IP; Robert Plotkin

(57) ABSTRACT

A computer-implemented method and system manages and processes outstanding invoices within various accounting software applications. The method includes analyzing a web page to identify a unique invoice identifier (e.g., within the web page's URL or a user interface element of the web page), obtaining additional invoice information from the accounting system based on the unique invoice identifier, and displaying this information in a user-friendly interface. A web browser plugin facilitates real-time data synchronization and payment processing by interacting with the accounting system through an API. The system streamlines the payment process by reducing the number of steps required, improving the efficiency and accuracy of financial transactions. The system is designed to be compatible with multiple accounting systems and web browsers, ensuring broad applicability and ease of use.

28 Claims, 11 Drawing Sheets

COMPUTER-AUTOMATED INTEGRATION WITH WEB-BASED ACCOUNTING SYSTEMS FOR IMPROVED DISPLAY AND PROCESSING OF INVOICES

BACKGROUND

The current state of the art in accounting systems involves various software applications designed to manage financial transactions, including the tracking and processing of outstanding invoices. These systems are integral to businesses as they provide a means to oversee accounts receivable and payable, ensuring that invoices are paid and received in a timely manner.

Typically, users (including both vendors and their customers) must navigate through multiple steps within these accounting systems to access detailed information about each outstanding invoice. For example, from the vendor's perspective, this process often involves logging into the vendor's account in the accounting system, navigating to the accounts receivable section, selecting individual invoices, and then reviewing the details of each invoice separately. The information about each invoice is usually displayed in a standardized format within the system, and users must manually search for specific details relevant to their needs, which may be distributed across multiple parts of the system.

When it comes to processing payments for these invoices by customers, vendors are again required to engage in a multi-step procedure. This usually includes selecting the invoice for payment, entering or confirming payment details, and authorizing the transaction. The process can be time-consuming, especially when dealing with a large number of invoices or when the user is required to process payments for multiple customers.

What is needed, therefore, are more efficient methods for processing payments against outstanding invoices in accounting systems.

SUMMARY

A computer-implemented method and system manages and processes outstanding invoices within various accounting software applications. The method includes analyzing a web page to identify a unique invoice identifier (e.g., within the web page's URL or a user interface element of the web page), obtaining additional information based on the unique invoice identifier, such as additional invoice information from the accounting system and payment method data, and displaying this information in a user-friendly interface. A web browser plugin facilitates real-time data synchronization and payment processing by interacting with the accounting system through an API. The system streamlines the payment process by reducing the number of steps required, improving the efficiency and accuracy of financial transactions. The system is designed to be compatible with multiple accounting systems and web browsers, ensuring broad applicability and ease of use.

Other features and advantages of various aspects and embodiments of the present invention will become apparent from the following description and from the claims.

BRIEF DESCRIPTION OF THE DRAWINGS

Figure 3B:
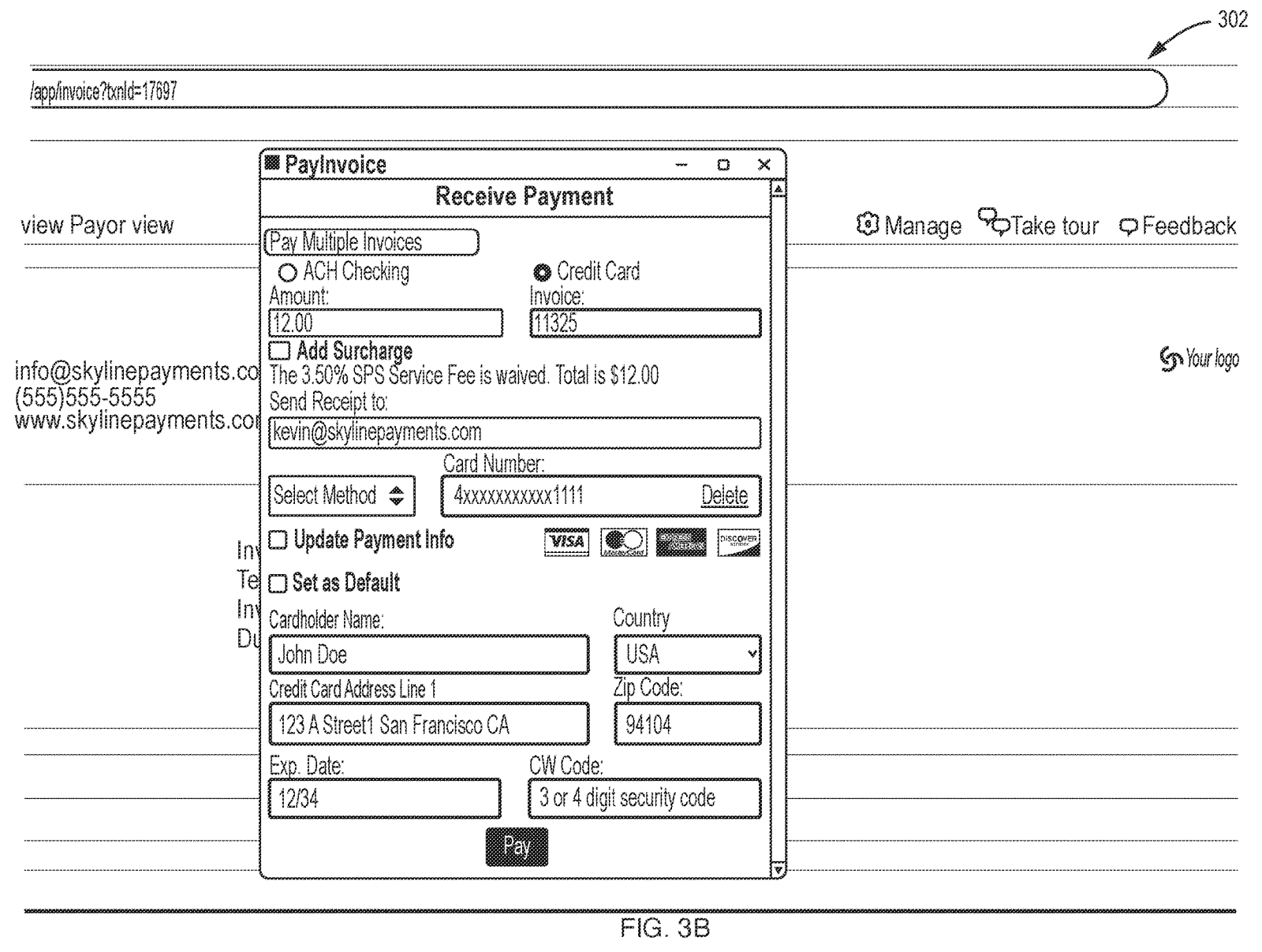

FIGS. 3A-3H are illustrations of user interfaces implemented according to embodiments of the present invention.

DETAILED DESCRIPTION

In the realm of financial management, particularly within the scope of accounting practices, the efficient handling of accounts receivable stands as a critical business function. The ability to effectively manage and process outstanding invoices is paramount for maintaining cash flow and ensuring the financial health of an organization. However, the traditional methods employed by existing accounting systems to display and process these invoices are often cumbersome and fragmented, requiring users to engage in a series of repetitive, inefficient, and time-consuming steps.

One motivation for the present invention arises from the recognized need for a more streamlined approach to invoice management, especially on the vendor side in the context of managing and processing payments against open invoices in the vendor's accounts receivable system. Because managing and processing payments against such invoices is such a critical and common task, any increased efficiency in processing such payments stands to significantly reduce the cognitive load and manual effort required to manage accounts receivable. Embodiments of the present invention aim to address the inefficiencies of current systems by introducing features that simplify the user experience and enhance the overall process of managing outstanding invoices.

Embodiments of the invention include a novel method for displaying information about outstanding invoices and processing their payments within digital accounting systems. It leverages technological advancements to provide users with a unified interface that aggregates all pertinent invoice details in a single, easily accessible user interface. This approach not only saves time but also minimizes the potential for errors that can occur when handling multiple invoices across various platforms.

Furthermore, embodiments of the present invention are designed to be versatile, offering compatibility with a wide array of accounting systems. This interoperability ensures that users can enjoy a consistent and simplified experience regardless of the underlying accounting platform they are utilizing. By focusing on user-centric design principles, embodiments of the present invention aim to transform the way users interact with accounting systems, making the process more intuitive and less labor-intensive.

In essence, embodiments of the present invention set out to significantly increase the efficiency of accounts receivable payment processing by providing a solution that is both highly automated and user-friendly. It promises to deliver significant benefits to users, including time savings, reduced complexity, and an overall improvement in the workflow associated with financial transactions.

Figure 1:
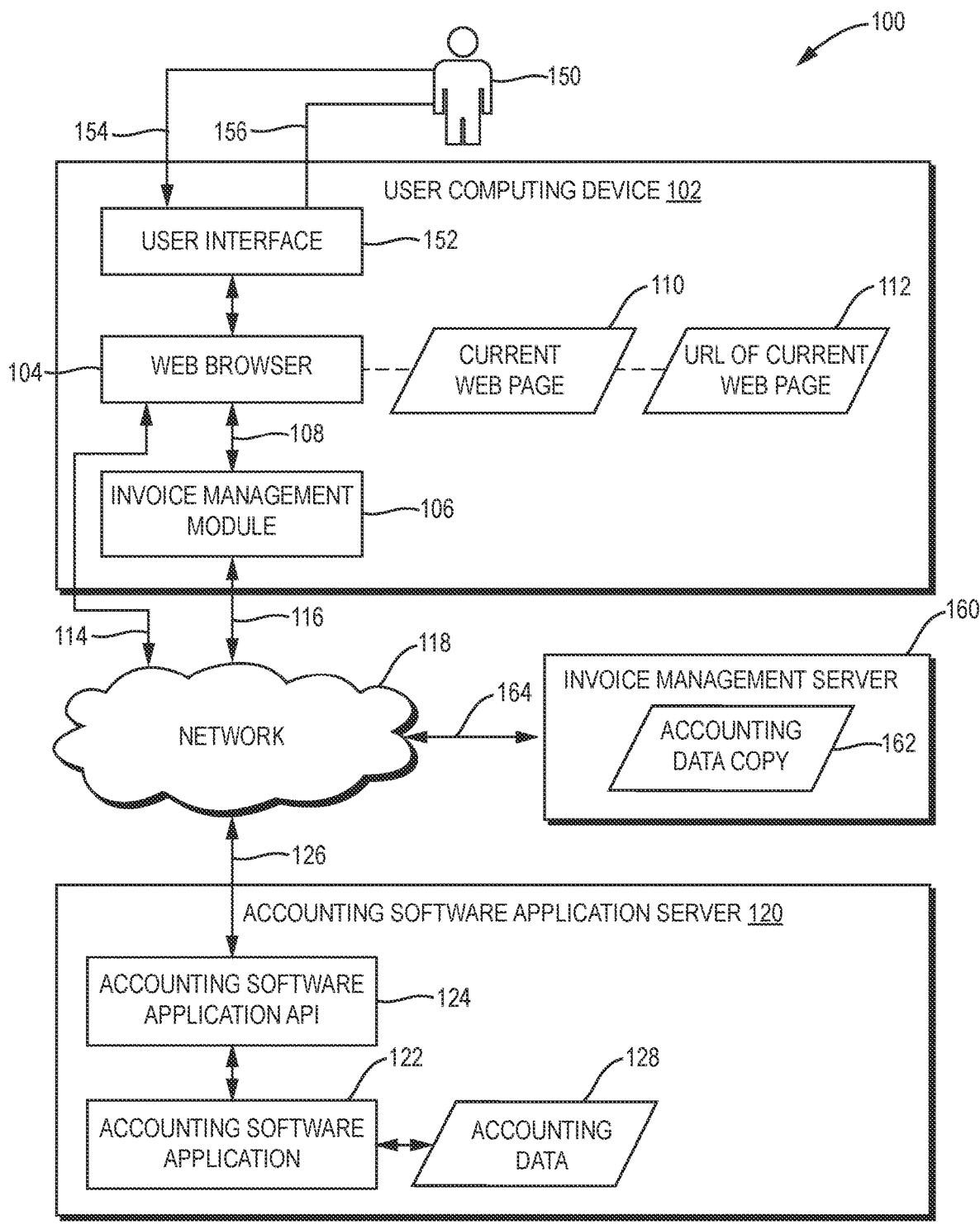
FIG. 1 is a diagram of a system for processing a payment of a single customer invoice according to one embodiment of the present invention.

Referring to FIG. 1, a diagram is shown of a system 100 for processing a payment of a single customer invoice according to one embodiment of the present invention. The system 100 includes a user 150 and a computing device 102 of the user 150, also referred to herein as the user computing device 102. The user computing device 102 may be any type of computing device, such as a desktop computer, laptop computer, tablet computer, or smartphone. Although the description herein describes the user computing device 102 as performing a variety of functions, in practice the user 150 may use one or more computing devices to perform the functions disclosed herein.

The system 100 also includes a web browser 104, which may execute on the user computing device 102 and perform any of the conventional functions associated with a web browser. For example, the web browser 104 may interact with one or more web servers over a network 118 to retrieve and display web page content.

The web browser 104 may include a user interface 152, which may receive input 154 from the user 150 and provide output 156 to the user 150 in any of the conventional ways associated with a web browser. For example, the input 154 may specify a URL 112 of a web page to which the user 150 wishes to navigate, in response to which the web browser 104 may navigate to the web page specified by that URL and display that web page as a current web page 110. The web browser 104 may use the user interface 152 to render the current web page 110 and display the resulting rendered web page in the output 156 to the user 150. These are merely high-level examples of conventional ways in which the web browser 104 may operate. More generally, the web browser 104 may perform any of the conventional functions of a web browser. As this implies, the user interface 152 may perform any of the conventional functions of a web browser user interface, and the input 154 and output 156 may be any of the conventional kinds of inputs and outputs known to be input to and output by a web browser user interface.

The system 100 may also include an invoice management module 106. In general, and as will be described in more detail herein, the invoice management module 106 may perform a variety of functions relating to invoices, such as obtaining information about outstanding invoices, outputting such invoice information to the user 150, and processing payments of such invoices. As will further be described in more detail herein, the invoice management module 106 may engage in a variety of communications 108 with the web browser 104 to perform the functions disclosed herein.

The invoice management module 106 may, for example, be implemented as a plugin, extension, or other kind of add-on to the web browser 104. This is merely an example however, and does not constitute a limitation of the present invention. More generally, the invoice management module 106 may be implemented in any manner, such as a stand-alone application, as an integrated feature within the web browser 104, as a server-side application, or any combination thereof.

The system 100 also includes an accounting software application server 120, which may contain or otherwise host or act as a server for an accounting software application 122. The accounting software application 122 may, for example, be installed on and execute on the accounting software application server 120. In general, the accounting software application 122 may be a software application that manages accounting data 128, including maintaining and processing payments against outstanding invoices. The accounting software application 122 may, for example, be any of a variety of conventional network-accessible (e.g., web-based) accounting software applications, such as QuickBooks online, Freshbooks, or Netsuite.

The accounting software application 122 may interact with clients, such as the web browser 104 and the invoice management module 106 over the network 118 via an accounting software Application Program Interface (API) 124, which is shown as transmitting and receiving various communications 126 over the network 118 with one or more clients. For example, and as will be described in more detail below, the web browser 104 may transmit and receive various communications 114 to and from the accounting software application 122 over the network 118 via the accounting software application API 124. Similarly, and as will be described in more detail below, the web browser 104 may transmit and receive various communications 116 to and from the accounting software application 122 over the network 118 via the accounting software application API 124.

Before describing ways in which the system 100 may retrieve and display invoice information, and ways in which the system 100 may process invoice payments, a process for onboarding the user 150 (or an entity associated with the user 150, such as a vendor) will now be described. Although this onboarding process is not a requirement of the present invention, the onboarding process may be useful to enable embodiments of the present invention to operate more efficiently. In general, and as will now be described in more detail, the onboarding process involves several steps that prepare the components of the system 100 to work together seamlessly.

As part of the onboarding process, the invoice management module 106 may be installed in the system 100. If, for example, the invoice management module 106 is implemented as a plugin to the web browser 104, the plugin may be installed in the web browser 104. The invoice management module 106 may be configured with and store a variety of information, such as any one or more of the following: information identifying the accounting software application 122 (e.g., a name and/or other identifier of the accounting software application 122 to indicate the brand, version, and/or name of the accounting software application 122), information identifying the user 150 (e.g., account information of the user 150 with the invoice management module 106), and information associated with an account of the user 150 with the accounting software application server 120 and/or the accounting software application 122 (e.g., login credentials of the user 150 with the accounting software application server 120 and/or the accounting software application 122). The invoice management module 106 may receive and store any such information for future use.

The user 150 may have an account with the accounting software application server 120 and/or with the accounting software application 122. For ease of explanation, the following description will refer to an account of the user 150 with the accounting software application 122. Such an account, however, should be understood to be an account of the user 150 with either or both of the accounting software application server 120 and the accounting software application 122.

As previously mentioned, the user 150 may, for example, be associated with an entity, such as a vendor. Such an entity (e.g., vendor) may have an account with the accounting software application 122. The user 150 may be one of multiple users who are authorized to access the accounting software application server 120 and the accounting software application 122 on behalf of the vendor. Although the description herein refers to an account of the user 150 with the accounting software application 122, such an account should be understood to be an account of the user 150 and/or an account of an entity (e.g., vendor) with which the user 150 is associated.

Once the invoice management module 106 has been configured, the invoice management module 106 may make an initial connection to the account of the user 150 in the accounting software application 122, such as by logging in to the accounting software application 122 using the credentials of the user 150 with the accounting software application 122 that were previously received by the invoice management module 106. More generally, the invoice management module 106 may automatically establish and maintain such a connection on behalf of the user 150 whenever the invoice management module 106 executes.

During the onboarding process, the invoice management module 106 may obtain a variety of information from the accounting data 128 of the user 150 in the accounting software application 122. Account information which the invoice management module 106 may extract from the user 150's accounting data 128 with the accounting software application 122 may include any one or more of the following: information about the user 150, information about the user 150's customers, and information about invoices (e.g., open invoices) of the user 150's customers within the accounts receivable section of the user 150's accounting data 128. The invoice management module 106 may obtain such information via suitable interactions with the accounting software application 122, such as by making calls to the accounting software application API 124 over the network 118 and receiving responses to such calls over the network 118 (within communications 116 and communications 126).

The invoice management module 106 may store (e.g., on the computing device 102 and/or in one or more storage devices coupled to the computing device 102) any such information from the user 150's account for future use, so that the invoice management module 106 has immediate access to relevant data when performing the functions described herein, without needing to retrieve such information from the accounting software application 122 at runtime. The invoice management module 106 may, however, update its local copy of any such information by obtaining updated information from the accounting software application 122, using any suitable synchronization method. The invoice management module 106 may thereby obtain the benefits of directly accessing locally-stored account information of the user 150 (e.g., avoiding the overhead associated with repeatedly obtaining such information over the 118), without sacrificing accuracy in the event that the user 150's accounting data 128 is updated.

In addition, the system may include an invoice management server 160. In general, the invoice management server 160 may (e.g., during the onboarding process) obtain, from the accounting software application 122, any of a variety of information from the accounting data 128 of the user 150, such as any of the data that the invoice management module 106 is described above as obtaining from the accounting software application 122. The invoice management server 160 may store such obtained data in what is referred to herein as an accounting data copy 162. The invoice management server 160 may obtain such information via suitable interactions 164 with the accounting software application 122, such as by making calls to the accounting software application API 124 over the network 118 and receiving responses to such calls over the network 118.

The invoice management server 160 may serve as an intermediary data repository and processing hub that interfaces with the user 150's local invoice management module 106. The invoice management server 160 may copy and cache, in the accounting data copy 162, a subset or the entirety of the user 150's accounting data 128. This process may include a one-time or periodic synchronization over the network 118, ensuring that the invoice management server 160 maintains an up-to-date replica of some or all of the user 150's accounting data 128. By doing so, the invoice management server 160 provides an easily-accessible access point for the invoice management module 106, reducing the need for frequent direct data retrieval from the accounting software application 122.

When the invoice management module 106 requires access to the user 150's accounting data 128, the invoice management module 106 may send a request to the invoice management server 160, instead of to the accounting software application 122. The invoice management server 160 may process such requests by retrieving the necessary data from the accounting data copy 162 and providing the retrieved data to the invoice management module 106. This approach may minimize latency and network load by avoiding direct queries to the accounting software application 122 for each data access operation. By offloading data storage and retrieval tasks to the invoice management server 160, the system 100 may minimize the computational burden on the user computing device 102. This may result in faster response times and a more fluid user experience, as the invoice management module 106 can access cached data from the accounting data copy 162 with minimal delay.

More generally, any read or write request from the invoice management module 106 may be directed to any one or more of the following: data stored locally by the invoice management module 106 or otherwise by the user computing device 102; the invoice management server 160; or the accounting software application 122. Those having ordinary skill will understand how to implement various embodiments of the system 100 to process such read and write requests from any of these stores of data, based on design choices involving tradeoffs between local and remote storage, network latency, and other factors. As a result, any reference herein to the invoice management module 106 requesting, reading, writing, or otherwise accessing the accounting data 128 should be understood to encompass embodiments in which such access is performed by accessing the accounting data 128 itself at the accounting software application server 120, by accessing the accounting data copy 162, by accessing a copy of the accounting data 128 that is stored locally by the invoice management module 106, or any suitable combination thereof.

In general, by performing this onboarding process, the invoice management module 106 ensures that it is ready to perform its functions efficiently. For example, by performing this onboarding process, the invoice management module 106 can avoid the need to request account information from the user 150 multiple times, and can also avoid the need to download the user 150's accounting data 128 more frequently than necessary.

Figure 2A:
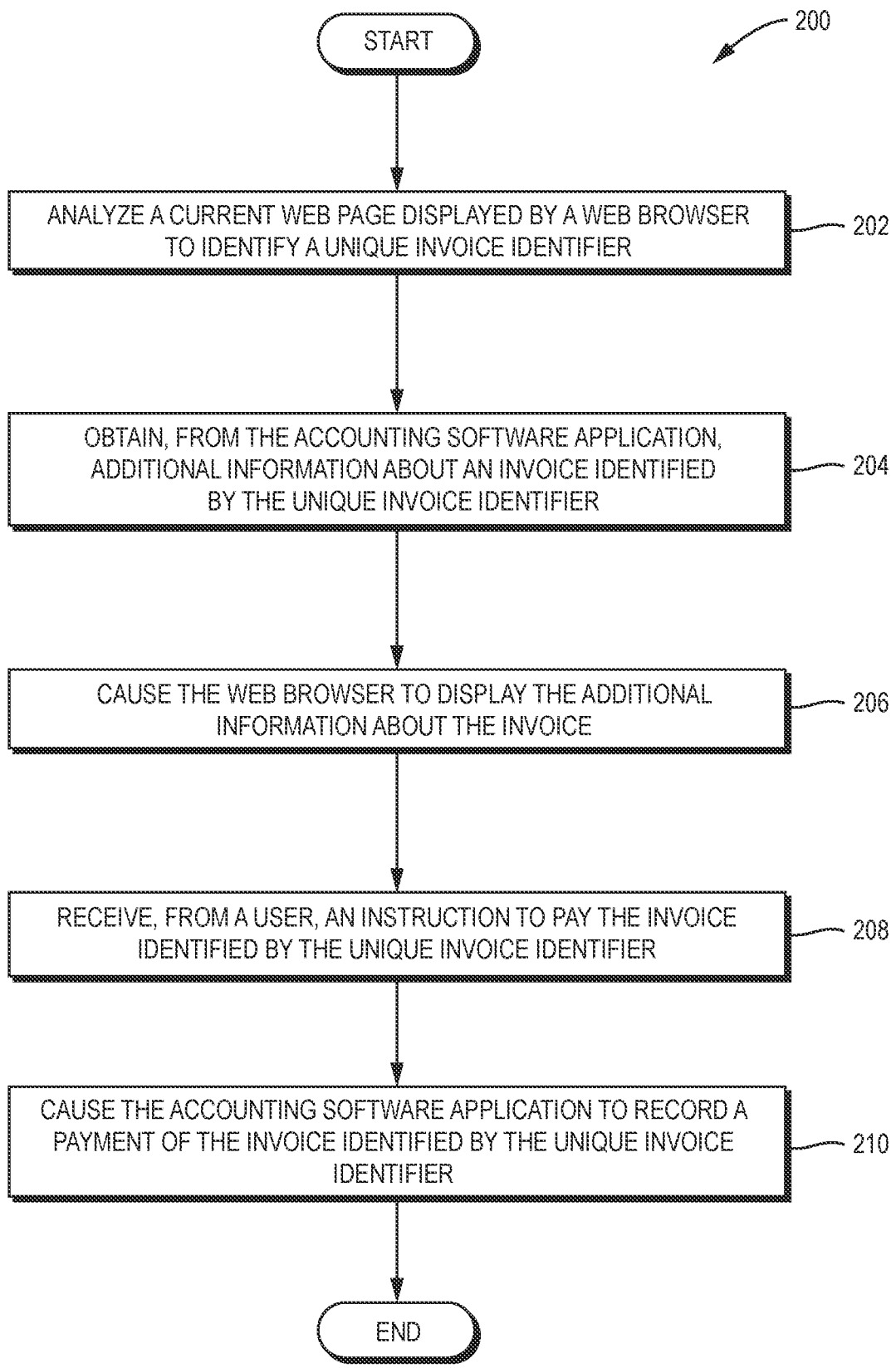
FIG. 2A is a flowchart of a method performed by the system of FIG. 1 to process a single invoice according to one embodiment of the present invention.

Referring to FIG. 2A, a flowchart is shown of a method 200 performed by the system 100 of FIG. 1 according to one embodiment of the present invention. Assume that, before the method 200 begins, the user 150 has already used the web browser 104 to navigate to the current web page 110. The URL 112 is the URL of the current web page 110. Further assume that the current web page 110 is a web page that has been served by the accounting software application server 120, and which displays an open invoice of a customer within the accounts receivable of the user 150's account with the accounting software application 122.

The method 200 includes analyzing the current web page 110 displayed by the web browser 104 to identify a unique invoice identifier (FIG. 2A, operation 202). Operation 202 may, for example, be performed by the invoice management module 106, which, as described elsewhere herein, may be implemented as a plugin to the web browser 104. As will be described in more detail below, the unique invoice identifier is subsequently used to retrieve additional invoice information and to facilitate payment of the invoice identified by the unique invoice identifier.

Note that the unique invoice identifier identified by the method 200 in operation 202 may or may not be the invoice identifier that the accounting software application 122 displays to the user 150 to identify the corresponding invoice. For example, in connection with any particular invoice, the accounting software application 122 may create and store a unique invoice identifier for internal purposes. This unique invoice identifier may, for example, be created by the accounting software application 122 at the time of creating the invoice and may not change over time. In addition, the accounting software application 122 may create and store an additional unique invoice identifier, referred to herein as the "user invoice identifier," which may or may not be the same as the unique invoice identifier. For example, in the example web page 300 of FIG. 3A, the unique invoice identifier can be seen from the URL of the current web page 110 to be 17697, while the user invoice identifier, which is displayed in the text field labeled "Invoice no.", can be seen to be 11325. As this example illustrates, the unique invoice identifier may not be the same as the user invoice identifier.

If the user 150 changes the user invoice identifier (e.g., to a value other than 11325), the unique invoice identifier may remain the same. The user 150 may store a mapping between the unique invoice identifier and the user invoice identifier in the accounting data 128, which enables the accounting software application 122 to look up the user invoice identifier based on the unique invoice identifier, and to look up the unique invoice identifier based on the user invoice identifier.

Although, as just described, the unique invoice identifier and the user invoice identifier may (and often do) differ from each other, this is not a requirement of the present invention. Alternatively, for example, the unique invoice identifier and the user invoice identifier may have the same value as each other. As another example, the accounting software application 122 may only maintain the unique invoice identifier, and may use that unique invoice identifier to perform the functions of the user invoice identifier as well, such as by displaying the unique invoice identifier within web pages and other user interfaces (e.g., within the "Invoice no." field of the web page 300 of FIG. 3A).

Operation 202 may include analyzing any of a variety of aspects of the current web page 110 to identify the unique invoice identifier. For example, the method 200 may analyze the URL 112 of the current web page 110 to identify the unique invoice identifier. As another example, the method 200 may analyze one or more user interface elements of the current web page 110 to identify the unique invoice identifier. As a particular example, the method 200 may analyze a text field on the current web page 110 to identify the unique invoice identifier within that text field. Any reference herein to analyzing the current web page 110 to identify the unique invoice identifier should be understood to include analyzing the URL 112 of the current web page and/or one or more user interface elements of the current web page 110 to identify the unique invoice identifier.

Other examples of information within or related to the current web page 110 that the method 200 may analyze in operation 202 to identify the unique invoice identifier include any one or more of the following, in any combination:

Textual content of the current web page 110, such as visible text that may include invoice numbers, customer names, or other identifying information.

HTML Tags: Specific tags (e.g., <span>, <div>, <p>) that might contain data attributes or text associated with the unique invoice identifier.

Form Fields: Input fields, hidden fields, or other form elements that may contain information that the method 200 may use to identify the unique invoice identifier.

JavaScript Variables: Variables within scripts on the current web page 110 that store the unique invoice identifier and/or information that may be used to identify the unique invoice identifier.

Embedded Objects: Embedded PDFs, images, or other objects that may include the unique invoice identifier and/or information that may be used to identify the unique invoice identifier.

The URL of the current web page 110, which may include query parameters, path segments, and/or URL fragments.

Webpage Metadata, such as meta tags, structured data, Open Graph tags, and/or canonical tags.

HTTP Headers: Response headers from the server that may include custom headers.

Cookies: Cookies set by the website that could store session-specific invoice identifiers.

API Responses: Data returned from API calls made by the current web page 110, which could include JSON or XML structures with invoice identifiers.

Browser History: The browser's history object that could contain URLs of previously visited invoice pages.

Cache Data: Cached data from previous interactions with the invoice page that might store identifiers.

The method 200 may use any of a variety of user interface elements to interact with the user 150 as part of analyzing the current web page 110 in operation 202 to identify the unique invoice identifier, such as any one or more of the following, in any combination:

Text Selection: The user 150 may select text on the current web page 110, and the invoice management module 106 may analyze that text to identify the unique invoice identifier. The selected text may, for example, include or consist of the unique invoice identifier, or the invoice management module 106 may identify the unique invoice identifier based on the selected text.

Context Menu Option: When the user 150 right-clicks on the current web page 110, the invoice management module 106 may analyze the text at the current cursor position or the text currently selected by the user to identify the unique invoice identifier in any of the ways disclosed herein.

Interactive Highlighting: The invoice management module 106 may automatically identify and highlight potential identifiers on the current web page 110, and the user 150 may provide input (e.g., click on) any such highlighted text to select text that represents the unique invoice identifier.

Drag-and-Drop Functionality: The user 150 may drag a piece of text or an element from the current web page 110 and drop it into a designated area of the invoice management module 106's interface to identify the unique invoice identifier.

Button or Link Overlays: The invoice management module 106 may overlay buttons or links next to potential unique invoice identifiers on the current web page 110. The user 150 may click one of these to provide the selected unique invoice identifier to the invoice management module 106 for processing.

Keyboard Shortcuts: The invoice management module 106 may predefine keyboard shortcuts, and the user 150 may provide input using one of those predefined keyboard shortcuts to capture the unique invoice identifier when it is selected or when the cursor is positioned near it on the current web page 110.

Tooltip Suggestions: When the user 150 hovers over a potential unique invoice identifier, the invoice management module 106 may display a tooltip to suggest that the user 150 can click to select the hovered-over unique invoice identifier for the invoice management module 106 to process.

Figure 3A:
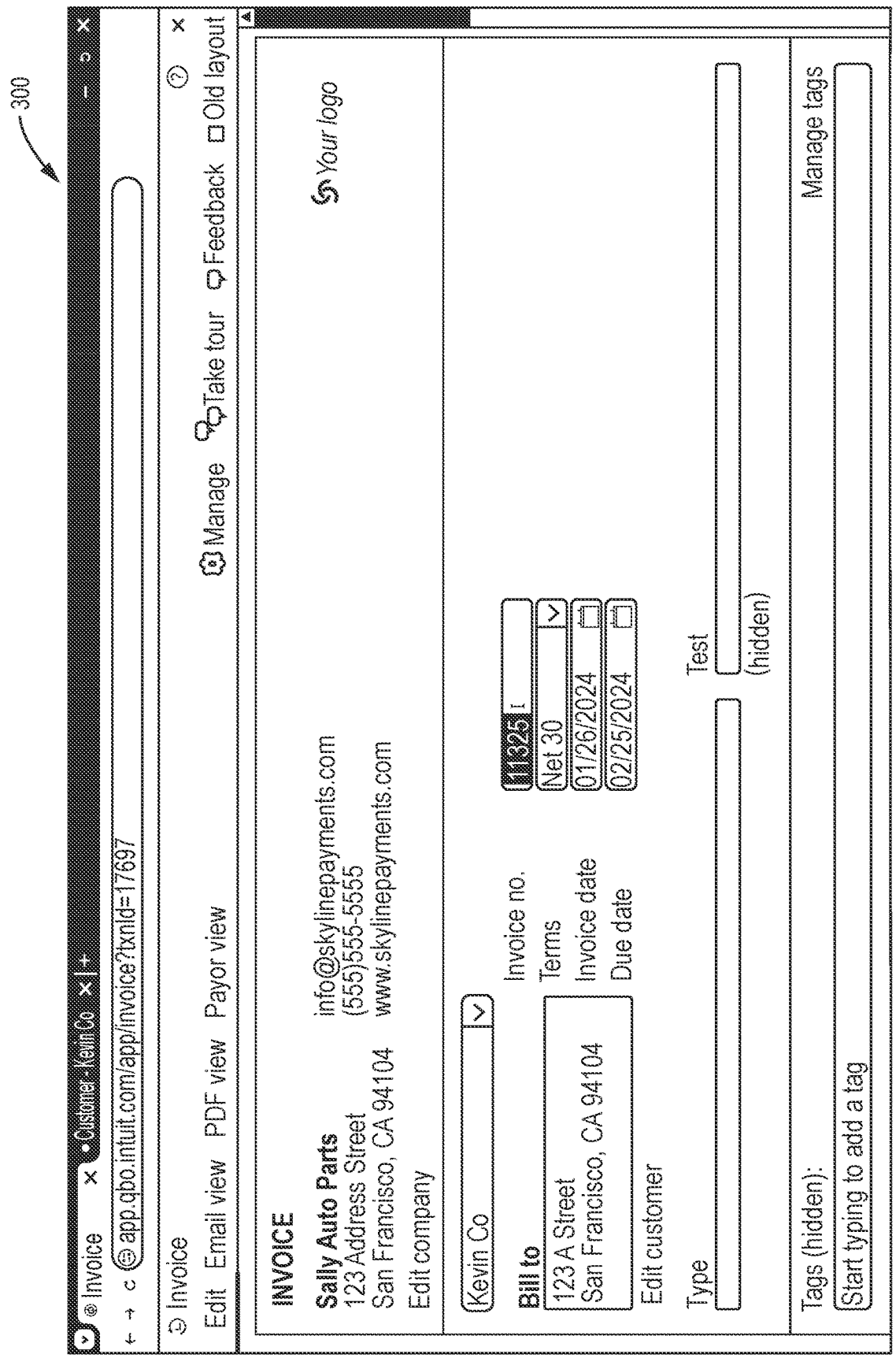

Referring to FIG. 3A, a diagram is shown of an example web page 300 displayed by the web browser 104 at the time of operation 202 according to one embodiment of the present invention. In the example of FIG. 3A, the web page 300 displays information about an invoice that is open in the user 150's accounting data 128 in the accounting software application 122. The web page 300 may, for example, be a conventional web page that is displayed by the accounting software application 122 via the web browser 104 to display information about an open invoice in the user 150's accounting data 128. As can be seen in FIG. 3A, the web page 300 includes a variety of information about the open invoice, such as the user invoice number, terms, invoice date, due date, and customer details. The particular structure, content, and layout of the web page 300 shown in FIG. 3A are merely examples and do not constitute limitations of the present invention.

The invoice management module 106 may initiate the analysis of the current web page 110 (e.g., the URL 112 of the current web page 110 and/or one or more user interface elements of the current web page 110) in operation 202 in response to any of a variety of triggers. For example, the user 150 may provide input 154 to the invoice management module 106, in response to which the invoice management module 106 may perform operation 202. As a particular example, the user 150 may select a user interface element displayed by the web browser 104. An example of such a user interface element is a button associated with a web browser plugin that implements the invoice management module 106. An example of such a button is shown in the upper right corner of the web page 300 of FIG. 3A. The user 150 may press that button, in response to which the invoice management module 106 may perform operation 202. As this example illustrates, the invoice management module 106 may perform operation 202 in response to as little as a single input (e.g., a selection of or other interaction with a single user interface element) by the user 150.

The invoice management module 106 may analyze the current web page 110 in any of a variety of ways to identify the unique invoice identifier. For example, the invoice management module 106 may analyze the current web page 110 to locate a specific pattern or sequence of characters that is known to precede, follow, or encapsulate the unique invoice identifier within one or more features of the current web page 110 (e.g., within the URL 112 and/or within one or more user interface elements of the current web page 110). The invoice management module 106 may use any of a variety of pattern matching algorithms to identify the unique invoice identifier within the current web page 110 (e.g., within the URL 112 and/or within one or more user interface elements of the current web page 110).

The invoice management module 106 may, for example, employ a pattern matching algorithm that has been preconfigured with knowledge of the structure and syntax used by the accounting software application 122 to embed invoice identifiers within the current web page 110 (e.g., within the URL 112 and/or within one or more user interface elements of the current web page 110). This algorithm may parse the current web page 110 to detect the presence of predetermined strings (e.g., delimiters) that signal the start and end points of the unique invoice identifier.

Once the relevant pattern is identified within the current web page 110, the invoice management module 106 isolates the unique invoice identifier from the surrounding characters. This identifier is a distinctive sequence of numbers, letters, or a combination thereof, which the accounting software application 122 assigns to each invoice as a means of unambiguous identification.

As noted elsewhere, embodiments of the present invention may be used with a variety of different software accounting applications. As this implies, the accounting software application 122 may merely be one instance of an accounting software application (e.g., QuickBooks Online) that is suitable for use with embodiments of the present invention. Although not shown in FIG. 1, an instance of a different accounting software application (e.g., Freshbooks) may also be suitable for use with embodiments of the present invention. Each such accounting software application may employ a different format for encoding unique invoice identifiers (e.g., within the URL 112 and/or within one or more user interface elements of the current web page 110), each having its own distinct way of embedding or otherwise encoding unique invoice identifiers. For example, two different accounting software applications may use different text string patterns to delimit or otherwise encode unique invoice identifiers. The invoice management module 106 may be configured with distinct pattern matching algorithms for such distinct text string patterns. When the invoice management module 106 analyzes the current web page 110 in operation 202, the invoice management module 106 may, for example, identify the accounting software application 122 and select the appropriate pattern matching algorithm for use in connection with that accounting software application 122. As this implies, the invoice management module 106 may use different pattern matching algorithms (or patterns) to identify unique invoices identifiers within the current web page 110 (e.g., within the URL 112 and/or within one or more user interface elements of the current web page 110), depending on the identity of the accounting software application 122. For example, the invoice management module 106 may use a first pattern matching algorithm (or pattern) to identify unique invoice identifiers within web pages of a first accounting software application, and may use a second, different, pattern matching algorithm (or pattern) to identify unique invoices identifiers within web pages of a second accounting software application.

Although the unique invoice identifier that is identified by the invoice management module 106 in operation 202 may be contained within the current web page 110 (e.g., within the URL 112 and/or within one or more user interface elements of the current web page 110), and the invoice management module 106 may identify the unique invoice identifier within the current web page 110, this is merely an example and does not constitute a limitation of the present invention. More generally, the invoice management module 106 may identify the unique invoice identifier based on the current web page 110 in any of a variety of ways, whether or not the unique invoice identifier is contained within the current web page 110. For example, the invoice management module 106 may perform any of a variety of processing on the current web page 110 to generate, derive, or otherwise identify the unique invoice identifier based on the current web page 110, even if the unique invoice identifier is not contained within the current web page 110. In particular, the invoice management module 106 may perform any of a variety of processing on the URL 112 to generate, derive, or otherwise identify the unique invoice identifier based on the URL 112, even if the unique invoice identifier is not contained within the URL 112.

The method 200 also includes obtaining, from the accounting software application 122, additional information about an invoice identified by the unique invoice identifier (FIG. 2A, operation 204). Operation 204 may, for example, be performed by the invoice management module 106. The invoice management module 106 may obtain the additional information about the invoice from the accounting software application 122 using any suitable communications 116 and 126 between the invoice management module 106 and the accounting software application 122, via the accounting software application API 124.

More specifically, for example, the invoice management module 106 may initiate a request to the accounting software application 122 via the accounting software application API 124. This request may be structured to include the unique invoice identifier as a parameter, thereby instructing the accounting software application 122 to return data associated with that specific invoice. The API 124 serves as a conduit for communication between the invoice management module 106 and the accounting software application, allowing for the exchange of information in a structured and standardized format.

Upon receiving the request, the accounting software application 122 may query the accounting data 128 (e.g., the accounts receivable portion of the user 150's account with the accounting software application 122) to locate the invoice corresponding to the provided unique invoice identifier. The accounting data 128, which stores comprehensive records of all transactions, including customer details, invoice amounts, due dates, payment statuses, and associated payment methods, may be searched by the accounting software application 122 to compile all relevant information pertaining to the identified invoice.

The accounting software application accounting software application 122 extracts the requested invoice information from the accounting data 128. This information may include, but is not limited to, customer information (e.g., any one or more of the customer name, company name, customer contact information, customer account number or identifier, customer purchase order number, customer's preferred payment method(s)), invoice details (e.g., any one or more of customer invoice identifier, unique invoice identifier, date of issue, due date, description of goods or services provided, quantity of goods or services, unit price and line item totals, subtotal, taxes, discounts, total amount due, currency type), and payment information (e.g., payment status, payment terms, payment history, remaining balance, late fees, interest accrued).

Recall that the unique invoice identifier that the invoice management module 106 identifies in operation 202 may or may not be the same as the customer invoice number that the accounting software application 122 provides to the user 150. Therefore, when the accounting software application 122 extracts the requested invoice information from the accounting data 128, that extraction may include using the previously-described mapping between the unique invoice identifier and the corresponding user invoice identifier to lookup the corresponding user invoice identifier based on the unique invoice identifier. The resulting user invoice identifier may be among the additional invoice information that the accounting software application 122 extracts from the accounting data 128 based on the unique invoice identifier.

The accounting software application 122 transmits the extracted information back to the invoice management module 106 over the network 118 via the accounting software application API 124. The data may be sent in various formats, such as JSON or XML, which are easily parsed by the invoice management module 106 to facilitate the display of information to the user 150 via the user interface 152.

As previously described, in some embodiments, the invoice management module 106 may cache the obtained information locally on the computing device 102, either after receiving such data in response to a request as described, or in advance, thereby eliminating the need for such a request to be made to the accounting software application 122 at the time when the current web page 110 is displayed by the web browser 104. Such caching allows for quicker access to invoice details in subsequent interactions and reduces the need for repeated data retrieval from the accounting software application accounting software application 122, thereby enhancing performance of the system 100 and the user 150's experience.

The method 200 may further include causing the web browser 104 to display the additional information about the invoice (FIG. 2A, operation 206). Operation 206 may be performed by the invoice management module 106 and/or the invoice management server 160. Displaying the additional information about the invoice enhances the user experience by providing immediate access to comprehensive invoice details directly within the web browsing environment. The invoice management module 106 may cause the web browser 104 to display the additional information about the invoice in any of a variety of ways, such as any one or more of the following:

Pop-Up Window: A pop-up window or modal dialog box can be generated by the invoice management module 106, overlaying the display of the current web page 110 in the output 156 of the user interface 152. This window may be designed to present the additional invoice information in an organized and easily readable format, allowing the user 150 to review details without navigating away from the current page. An example of such a pop-up window 302 is shown in FIG. 3B.

Sidebar or Panel: An alternative to a pop-up window is a sidebar or panel that slides out from the edge of the display of the current web page 110. This panel may contain the additional invoice information and may be expanded or collapsed by the user 150 as needed, providing a non-intrusive yet accessible means of reviewing invoice details.

Dedicated Tab or Window: The invoice management module 106 may open a new browser tab or window dedicated to displaying the additional invoice information. This approach allows the user 150 to view the additional invoice information while simultaneously viewing the current web page 110, or to alternative between the additional invoice information and the current web page 110.

In-Page Overlay: The additional invoice information may be displayed via an in-page overlay, which inserts the additional invoice information directly into the current web page 110's content. This method may be designed, for example, to dim the background content, focusing the user 150's attention on the invoice details.

Interactive Notifications: For brief highlights or critical information, the invoice management module 106 may use interactive browser notifications. These notifications may provide a summary of the invoice details and offer the user 150 the option to click through to view more comprehensive information.

Dynamic Content Injection: The invoice management module 106 may dynamically inject content into the current web page 110, creating sections or widgets that display the additional invoice information. This method allows for a seamless integration of data within the existing web page layout.

Responsive Design: Regardless of the chosen display method, the invoice management module 106 may ensure that the presentation of the additional invoice information is responsive and adapts to different screen sizes and resolutions, catering to a variety of devices such as desktops, laptops, tablets, and smartphones.

As mentioned above, FIG. 3B shows an example of an embodiment in which the invoice management module 106 displays the additional information about the invoice in the form of a pop-up window 302. In the example of FIG. 3B, the pop-up window 302 is shown as overlaying the web page 302 that displays the invoice details. The pop-up window 302 includes a variety of information, such as the invoice number, amount due, customer email address, user interface elements for displaying and/or editing the customer's payment method, and a "Pay" button. The particular structure, content, and layout of the pop-up window 302 shown in FIG. 3B are merely examples and do not constitute limitations of the present invention.

The method 200 may also include receiving, from the user 150, an instruction to pay the invoice identified by the unique invoice identifier (FIG. 2A, operation 208). Operation 208 may be performed by the invoice management module 106 and/or the invoice management server 160.

The invoice management module 106 may receive the user 150's instruction to pay via any of a variety of user interface mechanisms, such as any one or more of the following:

Payment Button: The most straightforward implementation is a "Pay" button displayed within the pop-up window, sidebar, or other dedicated user interface element in which the additional invoice information is presented. The user 150 may initiate payment by clicking, tapping, or otherwise selecting this button. An example of such a "Pay" button is shown in the pop-up window 302 of FIG. 3B.

Interactive Form: The user 150 may be presented with an interactive form that includes a payment button along with options to select a payment method, enter payment details, or confirm the amount to be paid. Submission of this form serves as an instruction to pay the invoice.

Voice Command: In systems equipped with voice recognition capabilities, the user 150 may provide a verbal instruction to pay the invoice. The invoice management module 106 may interpret this voice command as the user 150's intent to initiate payment.

Gesture Control: For touch-enabled devices, the user 150 may use a specific gesture, such as a swipe or tap-and-hold, on the displayed invoice information to indicate their desire to pay the invoice.

Keyboard Shortcut: Power users may prefer using keyboard shortcuts to expedite their workflow. The invoice management module 106 may be configured to recognize a predefined key combination as an instruction to pay the invoice.

Confirmation Dialog: To prevent accidental payments, the invoice management module 106 may implement a confirmation dialog that appears after the initial instruction is received. The user 150 must then confirm their intent to pay the invoice, thereby providing a two-step verification process.

Payment Links: The displayed invoice information may include a hyperlink or QR code that, when clicked or scanned, signifies the user 150's instruction to pay the invoice. This method can be particularly useful for mobile devices.

API-Driven Payment: For users who prefer automated or programmatic interactions, the invoice management module 106 may offer an API endpoint that accepts payment instructions from external scripts or systems managed by the user 150.

Biometric Authentication: In systems with biometric capabilities, such as fingerprint or facial recognition, the user 150's instruction to pay may be confirmed through a biometric prompt, adding a layer of security to the payment authorization process.

Each of these implementations provides a different method for the user 150 to convey their payment instruction, catering to diverse user 150 preferences and ensuring that the payment process is both user 150-friendly and secure. The invoice management module 106 may be designed to accommodate various user 150 interactions, making the payment process as intuitive and efficient as possible.

Before the user 150 provides the instruction to pay the invoice, the 150 may provide input containing information about a payment method to be used to pay the invoice. For example, the additional invoice information displayed in operation 206 may include information about a payment method associated with the customer who is associated with the invoice, such as that customer's preferred payment method. Such payment method information may, for example, be displayed within the same user interface element (e.g., window) as the additional invoice information.

The invoice management module 106 may provide the user 150 with the opportunity to review, approve, and/or edit the payment information before proceeding with the payment instruction. For example, upon displaying the invoice details within the web browser 104 in operation 206, the invoice management module 106 may also display the payment method preferred by the customer for settling the invoice. This payment method may for example, be a credit card, bank account, or any other payment option that the customer has previously selected or that is associated with the customer's account within the accounting software application 122.

The invoice management module 106 may control the user interface 152 to allow the user 150 to interact with the displayed payment information to review the customer's preferred payment method to ensure that it is the correct and intended source of payment for the invoice. If the payment method is correct, the user 150 may approve the use of this method with a simple confirmation action, such as clicking an "Approve" button, or merely by taking no action in connection with the payment information, in which case the user 150's issuance of the payment instruction constitutes the user 150's implicit approval of the payment information.

If the user 150 needs to change the payment method—for example, if the customer has updated their preferred payment method or if a different payment source is to be used—the user 150 may select an "Edit" option which allows the user 150 to modify the payment details, such as changing the credit card number, updating the expiration date, or selecting a different bank account. An example of such an "Edit" option is shown in the pop-up window 302 of FIG. 3B, in which the user 150 may select the "Update Payment Info" checkbox, in response to which the invoice management module 106 may enable the user 150 to edit the payment method information (e.g., card number, cardholder name, credit card address, zip code, country, expiration date, and/or CVV code) via the pop-up window 302.

After any necessary edits are made, the user 150 may, via the user interface 152, issue an instruction to save the updated payment information, in response to which the invoice management module 106 may interact with the accounting software application 122 to save the updated payment method information into the user 150's account in the accounting data 128. Issuing an instruction to pay the invoice may be interpreted by the invoice management module 106 as a combined instruction to both save any updates to the payment method information and to pay the invoice using the updated payment method information. The resulting updated payment method information is then subsequently used by the accounting software application 122 to process payment of the invoice in any of the ways disclosed below.

This feature enhances the payment process by offering the user 150 the convenience of managing payment methods directly, the flexibility to select the most suitable payment source, the accuracy to reduce errors, the control to ensure appropriate use of the customer's preferred method, the ability to improve customer satisfaction, and the security of using up-to-date and secure payment information.

The method 200 may also include, in response to receiving the instruction to pay the invoice identified by the unique invoice identifier, causing the accounting software application 122 to record a payment of the invoice identified by the unique invoice identifier (FIG. 2A, operation 210). Operation 210 may be performed by the invoice management module 106 and/or the invoice management server 160.

In response to receipt of the user 150's instruction to pay the invoice, the invoice management module 106 may communicate with the accounting software application 122 to trigger the recording of a payment against the invoice associated with the unique invoice identifier. This process can be implemented through any of a variety of methods. For example, the invoice management module 106 may make an API call to the accounting software application 122 via the accounting software application API 124, sending a request that includes the unique invoice identifier and payment details such as the amount, payment method, and date. The accounting software application 122 then processes the request and records the payment, including updating the accounting data 128 accordingly.

As another example, the 106 may simulate the submission of a payment form within the accounting software application 122's user interface, auto-filling the necessary fields with the invoice identifier and payment information before programmatically submitting the form. As yet another example, if the invoice management module 106 has direct access to the accounting data 128, it can execute a database command to update the invoice record with the payment details, marking the invoice as paid or partially paid as appropriate. As yet another example, the invoice management module 106 may integrate with a payment processor that, once the payment is confirmed, communicates with the accounting software application 122 to update the invoice status accordingly in the accounting data 128. Regardless of the mechanism that is employed to cause the accounting software application 122 to process the invoice payment, the benefits of this feature include streamlined payment processing, reduced manual data entry, minimized errors, and real-time updating of the account data 128. By automating the payment recording process, the system 100 ensures that the accounting software application 122 reflects the most current payment status, thereby maintaining accurate and up-to-date financial information.

Figure 3C:
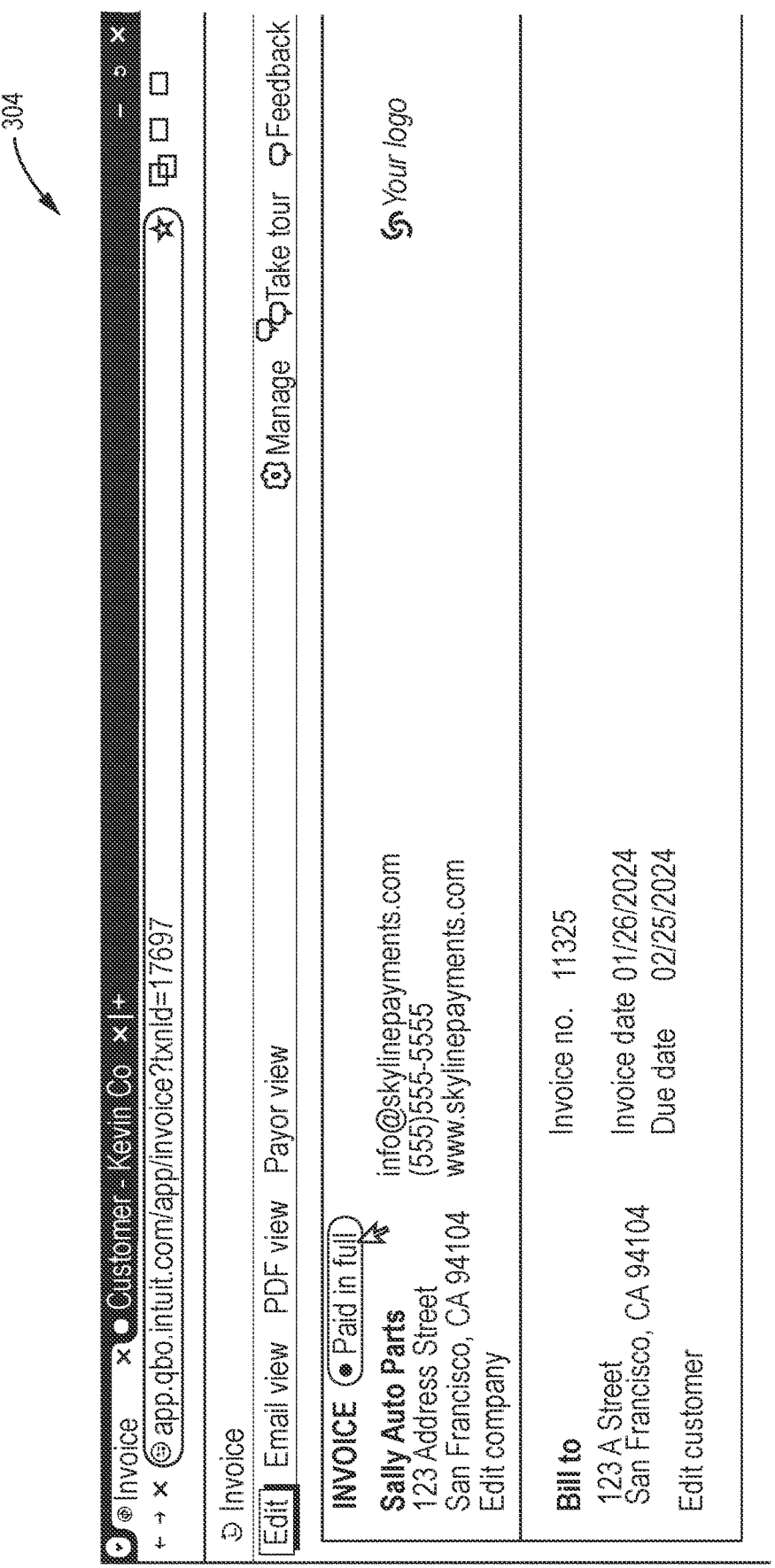
Figure 3D:
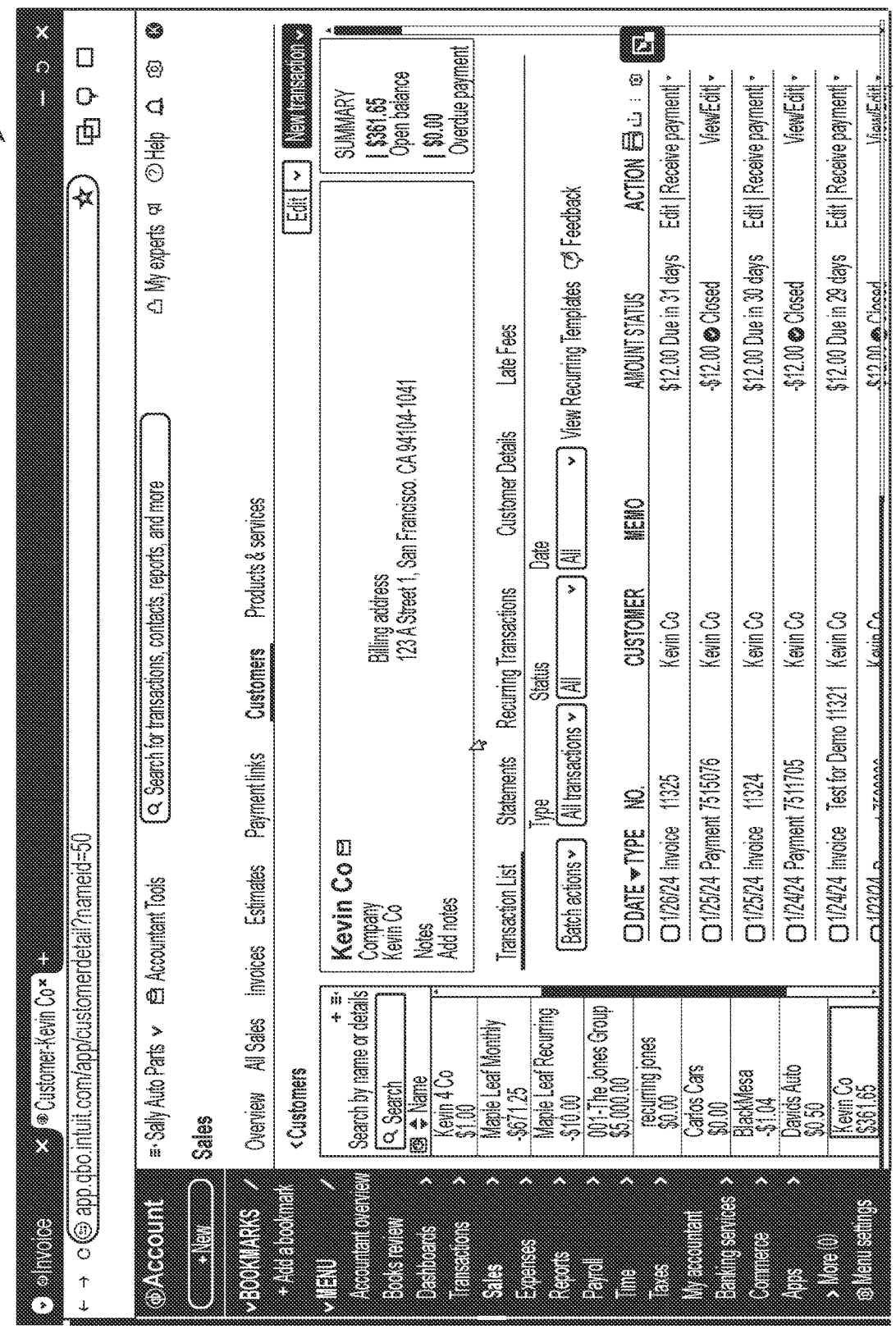

The invoice management module 106 may optionally provide output 156 to the user 150 to indicate a confirmation that the invoice has been paid. An example of such output 156 is shown in FIG. 3C in the form of a web page 304 in which the invoice is shown as having been paid in full. Although not shown in FIG. 3C, such output 156 may also show that the balance of the paid invoice is now zero.

A second embodiment of the present invention provides a method for managing and processing one or more open invoices for a customer within the user 150's accounting data 128 in the accounting software application 122. This second embodiment will now be described. Various aspects of this second embodiment operate in the same or similar manner to the first embodiment, in which a single displayed invoice is processed for payment. As a result, the following description will focus on aspects of the second (customer-based) embodiment, and it should be assumed that any aspects of the second embodiment that are not described below may be implemented in any of the ways disclosed herein in connection with the first (invoice-based) embodiment.

Figure 2B:
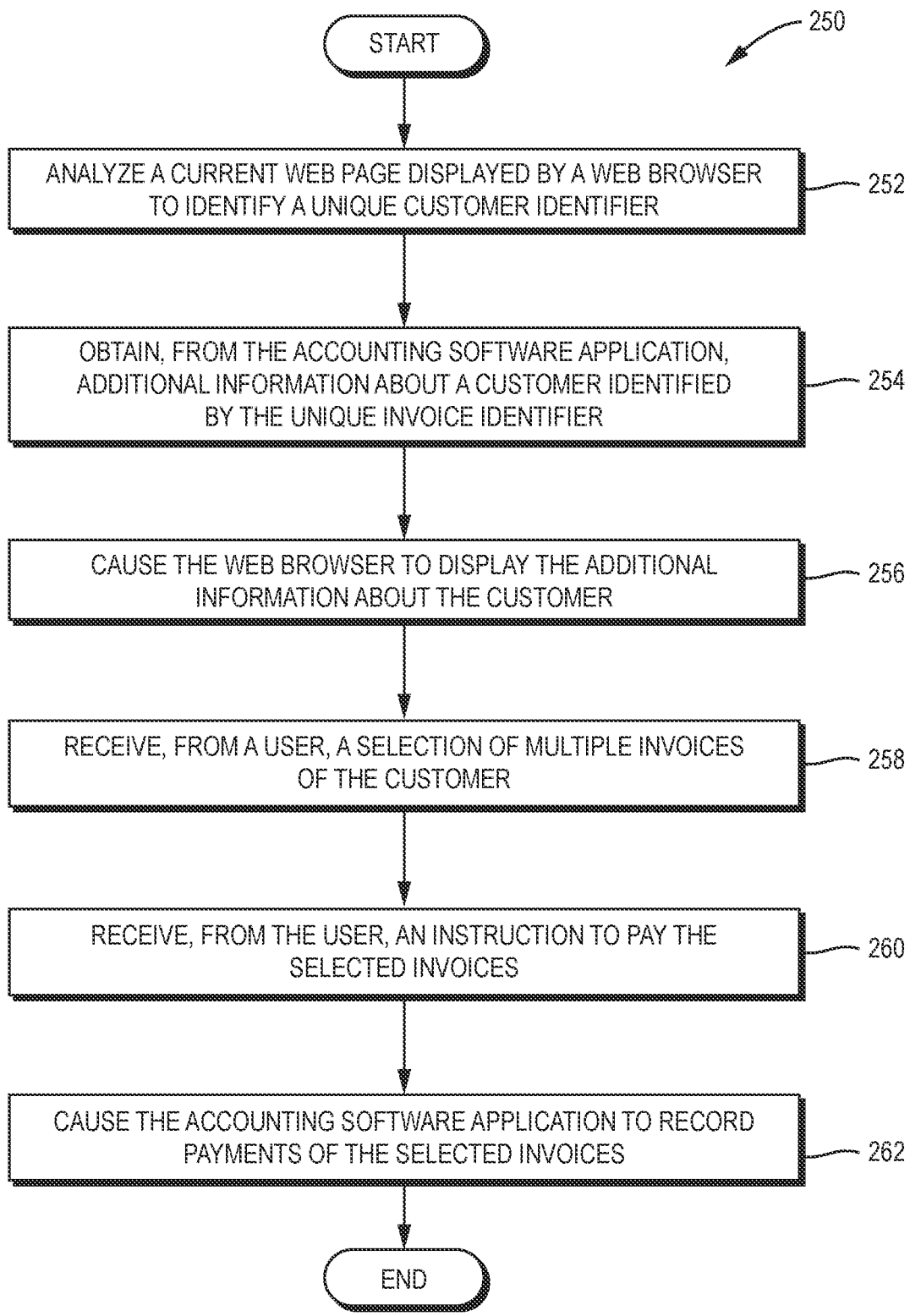
FIG. 2B is a flowchart of a method performed by the system of FIG. 1 to process one or more invoices of a customer according to one embodiment of the present invention.

Referring to FIG. 2B, a flowchart is shown of a method 250 performed by the system 100 of FIG. 1 according to the second embodiment of the present invention. Assume that, before the method 250 begins, the user 150 has already used the web browser 104 to navigate to the current web page 110. Further assume that the current web page 110 is a web page that has been served by the accounting software application server 120, and which displays information about a particular customer within the accounts receivable of the user 150's account with the accounting software application 122. Such information may include, for example, information about a plurality of open invoices of the customer within the accounts receivable section of the user 150's accounting data 128 in the accounting software application 122.

The method 250 includes analyzing the current web page 110 displayed by the web browser 104 (e.g., the URL 112 and/or within one or more user interface elements of the current web page 110) to identify a unique customer identifier (FIG. 2B, operation 252). Operation 252 may, for example, be performed by the invoice management module 106, which, as described elsewhere herein, may be implemented as a plugin to the web browser 104. As will be described in more detail below, the unique customer identifier is subsequently used to retrieve additional customer information and to facilitate payment of one or more of the customer's open invoices.

Referring to FIG. 3B, a diagram is shown of an example web page 306 displayed by the web browser 104 at the time of operation 252 according to one embodiment of the present invention. In the example of FIG. 3B, the web page 306 displays information about a customer of the user 150 in the user 150's accounting data 128 in the accounting software application 122. As can be seen in FIG. 3B, the web page 306 includes a variety of information about the customer, such as the customer's name and address, and information about a plurality of the customer's invoices (including both open and closed invoices). The particular structure, content, and layout of the web page 306 shown in FIG. 3B are merely examples and do not constitute limitations of the present invention.

The invoice management module 106 may initiate the analysis of the current web page 110 in operation 252 in response to any of a variety of triggers. For example, the user 150 may provide input 154 to the invoice management module 106, such as by pressing the web browser plug-in button previously described, in response to which the invoice management module 106 may perform operation 252.

The invoice management module 106 may analyze the current web page 110 in any of the ways disclosed above in connection with analyzing the current web page 110 to identify the unique invoice identifier, but instead to identify the unique customer identifier. The invoice management module 106 may, for example, employ a pattern matching algorithm that has been preconfigured with knowledge of the structure and syntax used by the accounting software application 122 to embed customer identifiers within web pages (e.g., URLs and/or user interface elements, such as text fields). This algorithm may parse the current web page 110 (e.g., the URL 112 and/or one or more user interface elements of the current web page 110) to detect the presence of predetermined strings (e.g., delimiters) that signal the start and end points of the unique customer identifier.

The method 250 also includes obtaining, from the accounting software application 122, additional information about the customer identified by the unique customer identifier (FIG. 2B, operation 254). Such additional information about the customer may include, for example, non-invoice information about the customer (such as the customer's name and address) and/or invoice-specific information about the customer (such as information about a plurality of open invoices of the customer within the accounts receivable section of the user 150's accounting data 128 within the accounting software application 122).

Operation 254 may, for example, be performed by the invoice management module 106. The invoice management module 106 may obtain the additional information about the customer from the accounting software application 122 using any suitable communications 116 and 126 between the invoice management module 106 and the accounting software application 122, via the accounting software application API 124.

The method 250 may further include causing the web browser 104 to display the additional information about the customer (FIG. 2B, operation 256). Operation 256 may be performed by the invoice management module 106 and/or the invoice management server 160. Displaying the additional information about the customer may include, for example, displaying non-invoice information about the customer (such as the customer's name and address) and/or invoice-specific information about the customer (such as information about a plurality of open invoices of the customer within the accounts receivable section of the user 150's accounting data 128 within the accounting software application 122).

Figure 3E:
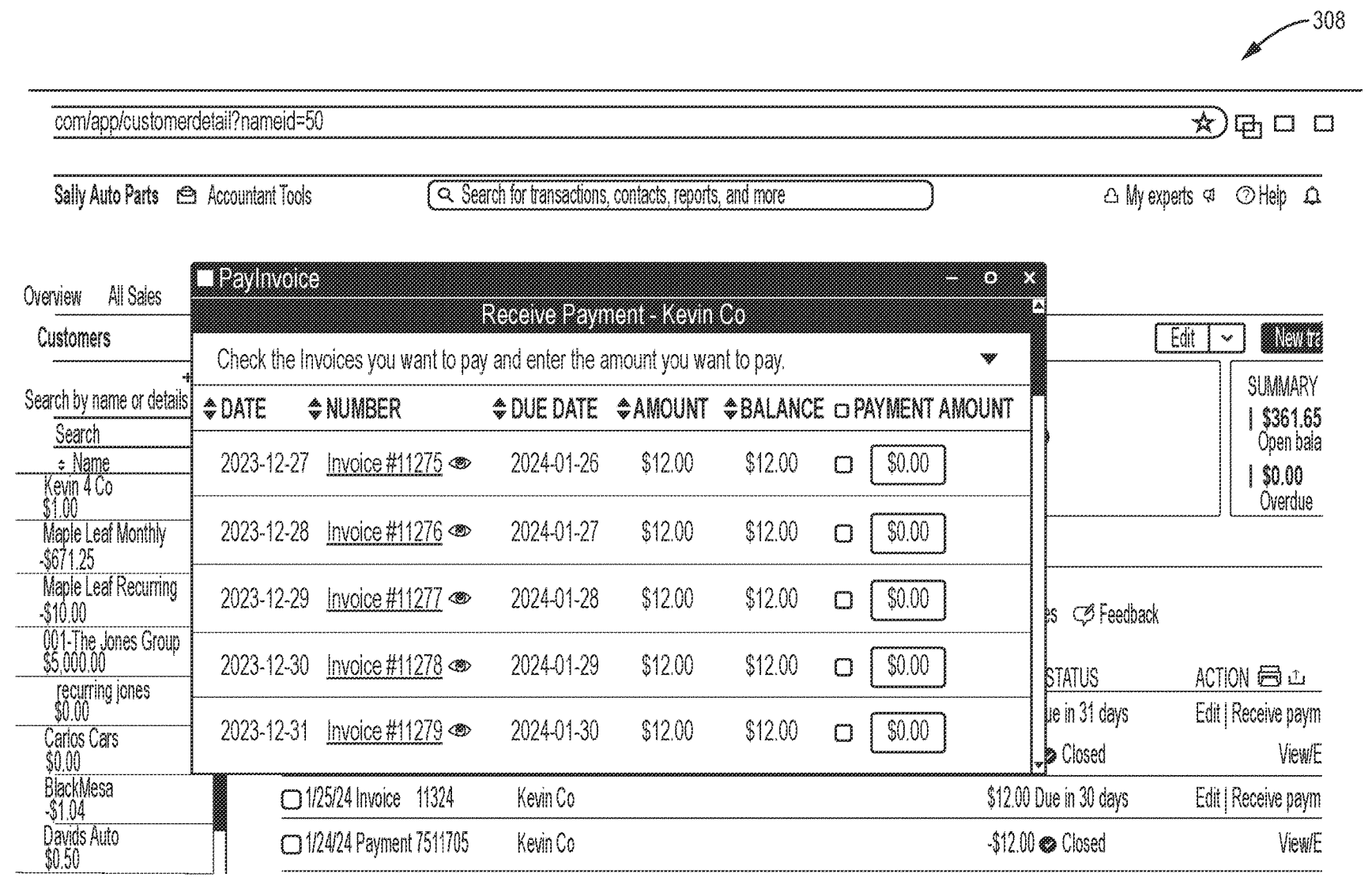

The display of the additional information about the customer may, for example, take any of the forms disclosed herein in connection with the display of the additional invoice information (e.g., as shown in FIG. 3B). As a particular example, a pop-up window or modal dialog box can be generated by the invoice management module 106, overlaying the display of the current web page 110 in the output 156 of the user interface 152. This window may be designed to present the additional customer information in an organized and easily readable format, allowing the user 150 to review details without navigating away from the current page. An example of such a pop-up window 308 containing customer information, including a plurality of open invoices of the customer, is shown in FIG. 3E.

Figure 3F:
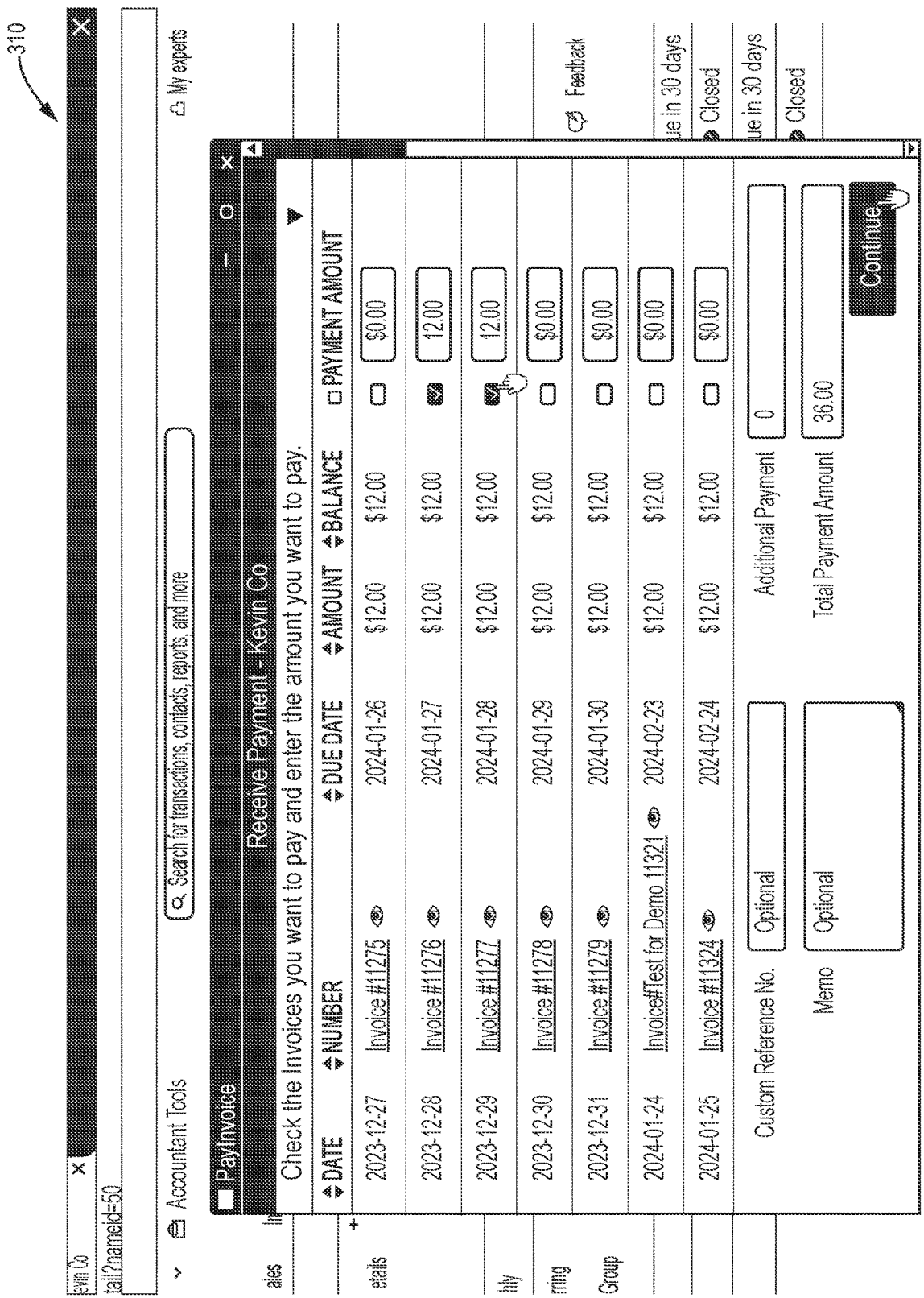

The method 250 may also include receiving, from the user 150, a selection of one or multiple invoices within the plurality of open invoices of the customer (FIG. 2, operation 258). Operation 258 may be performed by the invoice management module 106 and/or the invoice management server 160. An example of a pop-up window 310 in which the user 150 has selected multiple invoices for payment is shown in FIG. 3F. Upon selected all desired invoices, the user 150 may select a "Continue" button to continue to the invoice payment process.

The invoice management module 106 may receive the user 150's selection of one or more invoices via any of a variety of user interface mechanisms, such as any of the user interface mechanisms disclosed herein in connection with the user 150's selection of a single invoice in operation 208 (FIG. 2A). As one example, upon displaying the customer's open invoices in a pop-up window, the invoice management module 106 may present the user 150 with the option to select not just a single invoice but several invoices simultaneously. The user 150 may easily click on or otherwise indicate the desired invoices from the list displayed, in response to which the invoice management module 106 registers this selection in preparation for the subsequent payment processing step. This feature significantly streamlines the payment process for users who need to manage and settle multiple invoices for a customer, thereby enhancing the overall efficiency of the accounting tasks performed within the system 100.

Figure 3G:
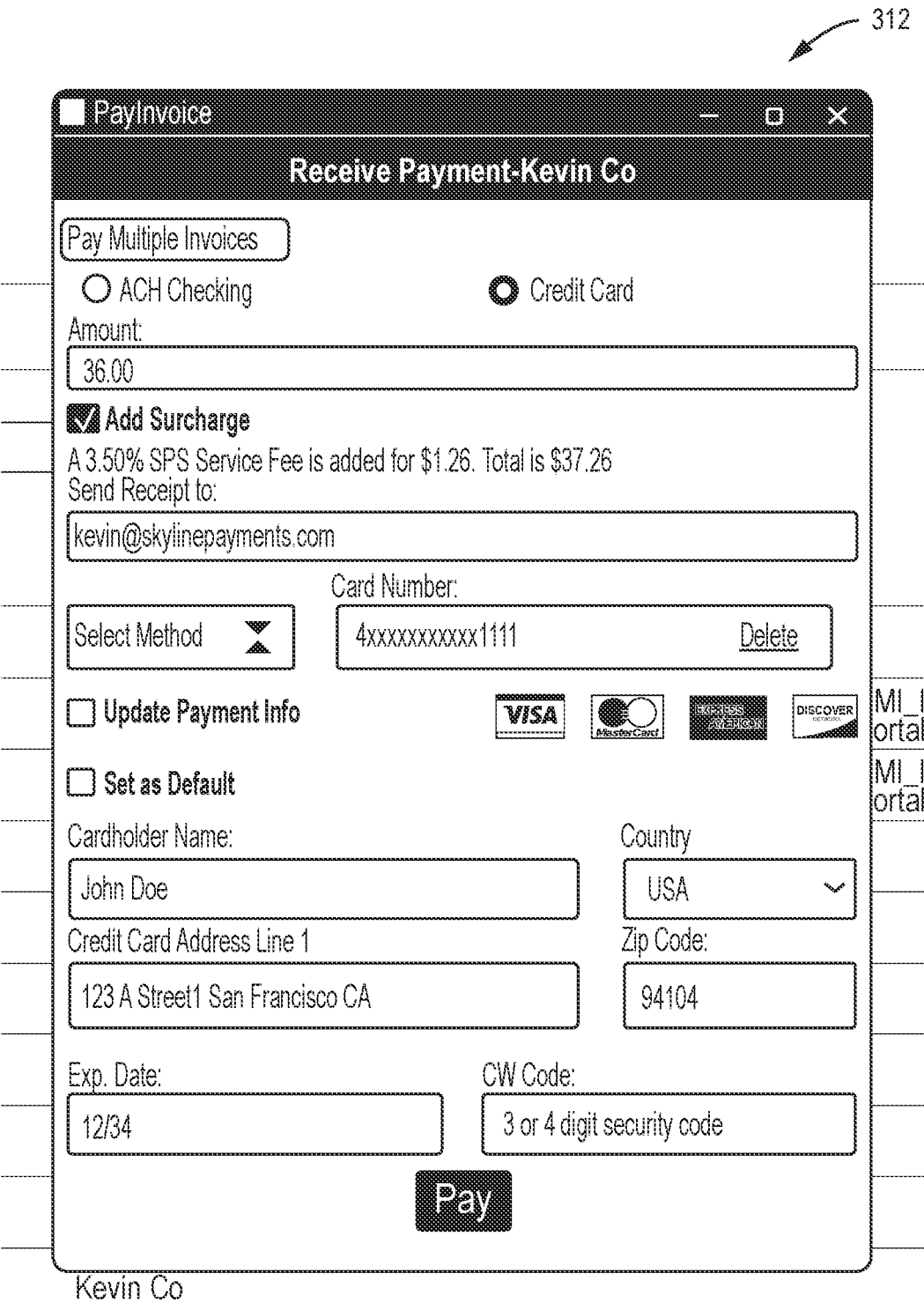

The method 250 may also include receiving, from the user 150, an instruction to pay the selected invoices (FIG. 2B, operation 260). Operation 260 may be performed by the invoice management module 106 and/or the invoice management server 160. Operation 260 may generally be performed in any of the ways disclosed herein in connection with providing the pay instruction in operation 208 (FIG. 2A). This may include, for example, receiving input from the user 150 which updates the customer's payment method in any of the ways disclosed herein in connection with operation 208. FIG. 3G illustrates an example of a popup window 312 which includes a "Pay" button that the user 150 may select to provide the instruction to pay the selected invoices.

The method 250 may also include, in response to receiving the instruction to pay the selected invoices, causing the accounting software application 122 to record payments of the selected invoices (FIG. 2B, operation 262). Operation 262 may be performed by the invoice management module 106 and/or the invoice management server 160. Operation 262 may cause the accounting software application 122 to record payment of each of the selected invoices in any of the ways disclosed herein in connection with causing the accounting software application 122 to record a payment of a single invoice in operation 210 (FIG. 2A).

Figure 3H:
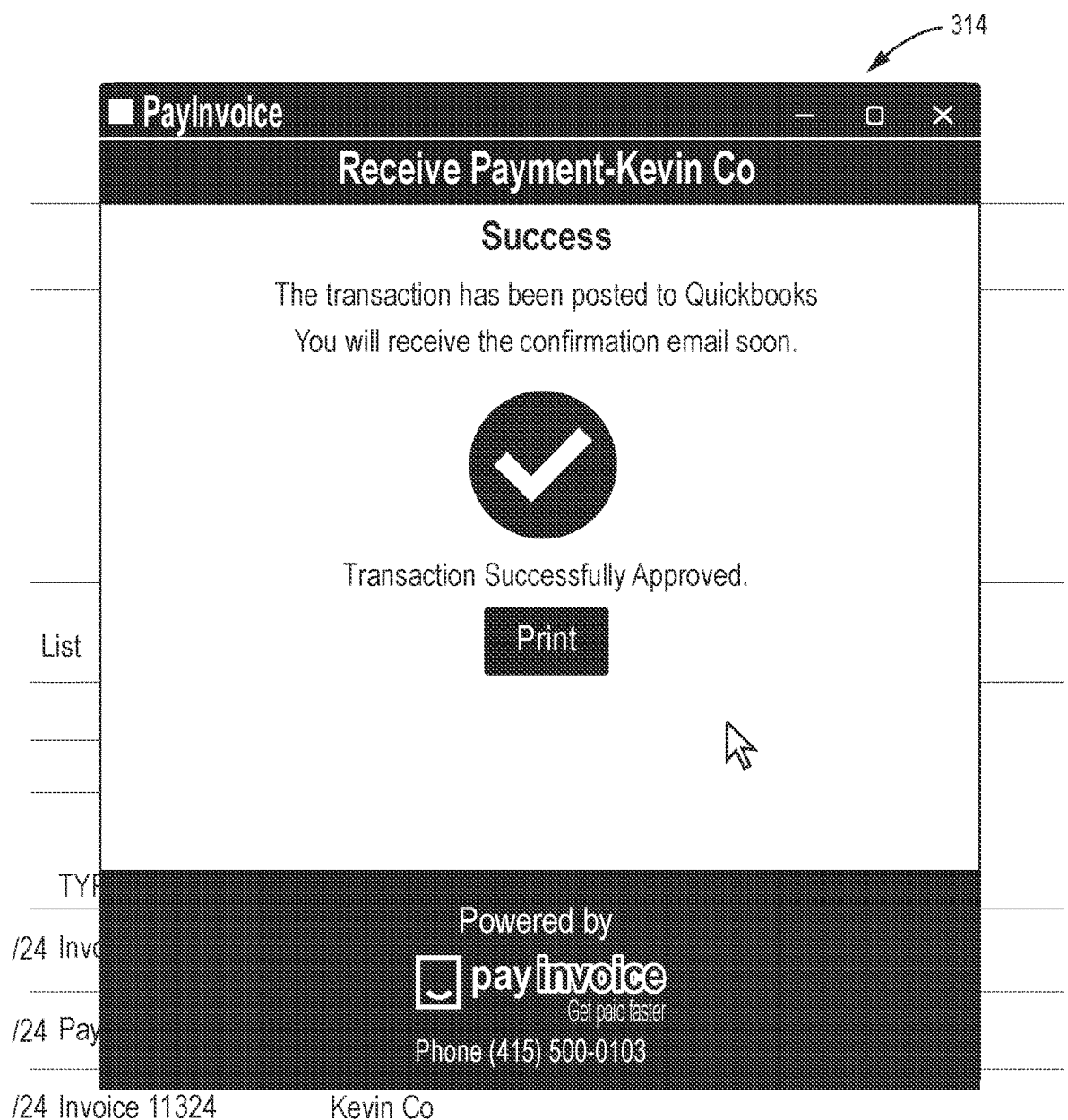

The invoice management module 106 may optionally provide output 156 to the user 150 to indicate a confirmation that the selected invoices have been paid. An example of such output 156 is shown in FIG. 3H in the form of a popup window 314 in which the selected invoices are shown as having been paid in full. Although not shown in FIG. 3H, such output 156 may also show that the balances of the paid invoices are now zero.

Embodiments of the present invention have a variety of advantages, such as one or more of the following.

For example, prior art systems often involve a cumbersome and manual process for managing and paying invoices, which can lead to several drawbacks, such as time-consuming payment processes involving multiple steps to view, manage, and pay invoices, including navigating through various screens or menus, manually entering payment details, and confirming transactions separately. Such tedious processes, involving significant amounts of manual data entry and navigation, increase the likelihood of human error, such as incorrect payment amounts, misapplied payments, or the use of outdated payment methods. Furthermore, prior art systems may often are not well-integrated, necessitating the use of separate platforms for viewing invoices, processing payments, and updating accounting records, leading to inefficiencies and potential discrepancies. Users may find it difficult to quickly access all relevant invoice information in one place when using such prior art systems, potentially leading to frustration and delays in the payment process. Prior art systems may not be designed for use across different devices or browsers, limiting user access to the system and the ability to manage invoices on-the-go. Such systems also scale poorly; as the volume of invoices increases, the manual and multi-step processes of prior art systems can become unmanageable and may not scale well with the growth of a business.

Embodiments of the present invention address these drawbacks through several key features. For example, embodiments of the present invention simplify the process of invoice payment by allowing users to view and pay invoices with fewer steps, directly within the web browser, and while remaining on the website of the accounting software application. This reduces the time spent on invoice management and payment processing. For example, in prior art systems, if the user is viewing an invoice or a customer on a webpage of the accounting software application and wishes to process an invoice payment using an invoice management application, the user typically must perform multiple steps, such as navigating to a webpage of the invoice management application, selecting an option to search by invoice number, inputting a desired invoice number and performing a search, selecting an invoice from the search results, inputting payment details, and submitting payment instructions. In comparison, embodiments of the present invention enable the user 150 to process payment of an invoice while remaining on the webpage of the accounting software application and without, for example, navigating to a separate webpage or logging into a separate application. Instead, as described elsewhere herein, the user may process an invoice payment right from the accounting software application webpage on which the invoice or customer information is being displayed, using the simple steps disclosed herein. This simplified process, which is aided by the system 100's automated onboarding process and retrieval of invoice details from the user 150's accounting data 128, not only greatly increases the efficiency of the invoice payment process, which can result in a significant reduction in time required, especially when the user 150 pays a large number of invoices, but also avoids taking the user's attention away from the current webpage of the accounting software application, which enables the user to remain focused on his or her existing workflow.

By automatically extracting invoice information from the current web page and using it to retrieve and display invoice details, embodiments of the present invention minimize the risk of human error associated with manual data entry.

Embodiments of the present invention interface with various accounting systems and can be implemented as a web browser plugin, providing a single, integrated solution for managing and paying invoices. Embodiments of the present invention present all relevant invoice information in an easy-to-understand format, such as a pop-up window, improving the overall user experience and making it easier to review and process payments. Embodiments of the present invention which are implemented using a web browser plugin can be designed to work across different web browsers and devices, offering greater accessibility and convenience for users who need to manage invoices from various locations. The automated and integrated nature of embodiments of the present invention allow it to handle a growing number of invoices efficiently, making it well-suited for businesses experiencing growth and an increased volume of transactions. In summary, by addressing the limitations of prior art systems, embodiments of the present invention provide a more efficient, accurate, and user-friendly approach to invoice management and payment processing.

Embodiments of the present invention address several technical problems by providing technical solutions that result in tangible technical effects. Some of these technical problems and their technical solutions and technical effects include the following.

Embodiments of the present invention present a solution to the technical problem of inefficient invoice management by introducing a web browser plugin that automates the extraction of invoice information directly from a web page (e.g., a URL or a user interface element). This technical solution significantly reduces the time needed to locate and process invoices, thereby enhancing the overall efficiency of invoice management workflows. The automation provided by the plugin represents a technical effect that includes automatically extracting the additional invoice information from the accounting data, leading to a more efficient invoice management and payment process.

Embodiments of the present invention addresses the problem of manual data entry errors by implementing a plugin that automatically identifies unique invoice identifiers and retrieves the corresponding information from the accounting system. This solution effectively eliminates the need for users to manually input data, which is a common source of errors in financial transactions and record-keeping. As a result of this automation, the risk of human error is significantly reduced, leading to enhanced accuracy in financial transactions and the maintenance of precise financial records. This technical effect not only improves the reliability of the data but also contributes to the integrity of the overall accounting process.

The technical problem of lack of real-time data synchronization in accounting systems is aptly addressed by the invoice management module, which establishes real-time communication with the accounting system. Utilizing communication mechanisms such as the accounting software application API, the plugin updates the payment status of invoices instantaneously upon receipt of payment instructions. This solution's technical effect is the immediate synchronization of accounting records, which guarantees that financial data is consistently current and reliable. The enhancement in data reliability is a direct consequence of the plugin's ability to provide up-to-date transactional information, thereby solving a critical issue faced by many accounting systems.

Embodiments of the present invention tackle the technical problem of limited system compatibility, which hampers the widespread adoption of accounting tools, by being designed to interface seamlessly with a diverse range of accounting systems and to maintain compatibility with various web browsers. The technical solution lies in the versatile design of the plugin, which is crafted to function across different software environments. The resulting technical effect of this approach is a broadened compatibility that significantly enhances the plugin's potential for widespread adoption and use. This cross-platform utility increases the invention's applicability and reach, ensuring that users can rely on the plugin regardless of their preferred accounting systems or web browsers.

Embodiments of the present invention introduce a technical solution to the problem of inefficient data management in accounting systems through an onboarding process that acquires and stores critical information, such as customer and invoice details, from the accounting system. This proactive approach to data management enables the plugin to operate using its own copies of the stored information, thereby diminishing the dependency on real-time data retrieval. The technical effect of this solution is a notable enhancement in the speed and efficiency of the plugin's functionality. By processing stored data instead of relying on live system queries, the plugin can offer faster response times and a more streamlined user experience, which is particularly beneficial in time-sensitive financial environments.

The technical solutions and the technical effects of those solutions described above demonstrate how embodiments of the present invention solve practical and technical problems in the field of accounting and financial management software, leading to improvements in efficiency, accuracy, and user experience.

One embodiment of the present invention is directed to a computer-implemented method for managing outstanding invoices in an accounting software application. The method includes: (a) analyzing a current web page displayed by a web browser to identify a unique invoice identifier; (b) obtaining, from the accounting software application, additional information about an invoice identified by the unique invoice identifier; (c) causing the web browser to display the additional information about the invoice; (d) receiving, from a user, an instruction to pay the invoice identified by the unique invoice identifier; and (e) in response to receiving the instruction to pay the invoice identified by the unique invoice identifier, causing the accounting software application to record a payment of the invoice identified by the unique invoice identifier.

In the method, (a) may include analyzing a URL of the current web page to identify the unique invoice identifier. In the method, (a) may include analyzing the URL of the current web page to identify the unique invoice identifier within the URL of the current web page based on a predetermined pattern associated with the accounting software application.

In the method, (a) may include analyzing a user interface element of the current web page to identify the unique invoice identifier. In the method, the user interface element may include a text field on the current web page.

In the method, (a), (b), (c), (d), and (e) may be performed by a plugin installed in the web browser.

In the method, the additional information may include at least one of customer details, invoice amount, invoice due date, and invoice payment status.

In the method, (b) may include making a request to the accounting software application via an Application Program Interface (API) and receiving the additional information via the API. In the method, the request may include the unique invoice identifier.

In the method, the current web page may be displayed by the web browser in a first user interface element; and causing the web browser to display the additional information about the invoice may include causing the web browser to display the additional information about the invoice in a second user interface element that is distinct from the first user interface element. In the method 10, the first user interface element may include a first window, and wherein the second user interface element may include a second window.

In the method, the additional information about the invoice may include information about a payment method associated with a customer associated with the invoice; and causing the web browser to display the additional information about the invoice may include causing the web browser to display the information about the payment method associated with the customer associated with the invoice. The method may further include, before (d): (f) receiving, from the user, an instruction to modify the payment method associated with the customer associated with the invoice, thereby producing a modified payment method associated with the customer associated with the invoice; and (e) may include causing the accounting software application to process the payment of the invoice identified by the unique invoice identifier using the modified payment method.

In the method, (c) may include displaying a user interface element for initiating the payment of the invoice identified by the unique invoice identifier; and (d) may include receiving, from the user, a selection of the user interface element for initiating the payment of the invoice identified by the unique invoice identifier. In the method, the user interface element for initiating the payment of the invoice identified by the unique invoice identifier may include a button.

In the method, (e) may include providing a request to the accounting software application to record the payment of the invoice identified by the unique invoice identifier, and wherein the request may include the unique invoice identifier.

Another embodiment of the present invention is directed to a computer-implemented method for managing outstanding invoices in an accounting software application. The method includes: (a) analyzing a current web page displayed by a web browser to identify a unique customer identifier; (b) obtaining, from the accounting software application, additional information about a customer identified by the unique customer identifier, the additional information including information about a plurality of open invoices of the customer; (c) causing the web browser to display the additional information about the customer, including the additional information about the plurality of open invoices of the customer; (d) receiving, from a user, a selection of multiple invoices within the plurality of open invoices of the customer; (e) receiving, from the user, an instruction to pay the multiple invoices; and (f) in response to receiving the instruction to pay the multiple invoices, causing the accounting software application to record payments of the multiple invoices.

In the method, (a) may include analyzing a URL of the current web page to identify the unique customer identifier. In the method, (a) may include analyzing the URL of the current web page to identify the unique customer identifier within the URL of the current web page based on a predetermined pattern associated with the accounting software application.

In the method, (a) may include analyzing a user interface element of the current web page to identify the unique customer identifier. In the method, the user interface element may include a text field on the current web page.

In the method, (a), (b), (c), (d), (e), and (f) may be performed by a plugin installed in the web browser.

23. In the method, the additional information may include at least one of customer details, invoice amount, invoice due date, and invoice payment status of each of the plurality of open invoices of the customer.

In the method, (b) may include making a request to the accounting software application via an Application Program Interface (API) and receiving the additional information via the API. In the method, the request may include the unique customer identifier.

In the method, the current web page may be displayed by the web browser in a first user interface element; and causing the web browser to display the additional information about the customer may include causing the web browser to display the additional information about the customer in a second user interface element that is distinct from the first user interface element. In the method, the first user interface element may include a first window, and the second user interface element may include a second window.

In the method, the additional information about the customer may include information about a payment method associated with the customer; and causing the web browser to display the additional information about the customer may include causing the web browser to display the information about the payment method associated with the customer. The method may further include, before (e): (g) receiving, from the user, an instruction to modify the payment method associated with the customer, thereby producing a modified payment method associated with the customer; and (f) may include causing the accounting software application to record the payments of the multiple invoices using the modified payment method.

In the method, (c) may include displaying a user interface element for initiating the payments of the multiple invoices; and (f) may include receiving, from the user, a selection of the user interface element for initiating the payments of the multiple invoices. In the method, the user interface element for initiating the payments of the multiple invoices may include a button.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the ability of embodiments of the present invention to perform pattern matching algorithms to identify unique invoice identifiers within a URL, and its subsequent interaction with an accounting system's API to process payments, are tasks that require the speed and computational capabilities of a computer system. Additionally, the plugin's real-time data synchronization, which updates the payment status of invoices immediately after payment instructions are received, is a complex process that involves instantaneous communication and data processing that cannot be replicated by human mental work or manual effort. These computer-implemented processes demonstrate that the invention constitutes more than a mere abstract idea, as they are grounded in specific technological processes that are inherently rooted in computer technology and which are beyond the scope of mental or manual execution.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A computer-implemented method for managing outstanding invoices in an accounting software application, the method comprising:
    (a) analyzing a current web page displayed by a web browser to identify a unique invoice identifier, comprising analyzing a URL of the current web page to identify the unique invoice identifier;
    (b) obtaining, from the accounting software application, additional information about an invoice identified by the unique invoice identifier;
    (c) causing the web browser to display the additional information about the invoice;
    (d) receiving, from a user, an instruction to pay the invoice identified by the unique invoice identifier; and
    (e) in response to receiving the instruction to pay the invoice identified by the unique invoice identifier, causing the accounting software application to record a payment of the invoice identified by the unique invoice identifier.

2. The method of claim 1, wherein (a) comprises analyzing the URL of the current web page to identify the unique invoice identifier within the URL of the current web page based on a predetermined pattern associated with the accounting software application.

3. The method of claim 1, wherein (a) comprises analyzing a user interface element of the current web page to identify the unique invoice identifier.

4. The method of claim 1, wherein (a), (b), (c), (d), and (e) are performed by a plugin installed in the web browser.

5. The method of claim 1, wherein the additional information includes at least one of customer details, invoice amount, invoice due date, and invoice payment status.

6. The method of claim 1, wherein (b) comprises making a request to the accounting software application via an Application Program Interface (API) and receiving the additional information via the API.

7. The method of claim 6, wherein the request includes the unique invoice identifier.

8. The method of claim 1:
    wherein the current web page is displayed by the web browser in a first user interface element; and
    wherein causing the web browser to display the additional information about the invoice comprises causing the web browser to display the additional information about the invoice in a second user interface element that is distinct from the first user interface element.

9. The method of claim 8, wherein the first user interface element comprises a first window, and wherein the second user interface element comprises a second window.

10. The method of claim 1:
    wherein the additional information about the invoice comprises information about a payment method associated with a customer associated with the invoice; and
    wherein causing the web browser to display the additional information about the invoice comprises causing the web browser to display the information about the payment method associated with the customer associated with the invoice.

11. The method of claim 10, further comprising, before (d):
    (f) receiving, from the user, an instruction to modify the payment method associated with the customer associated with the invoice, thereby producing a modified payment method associated with the customer associated with the invoice; and wherein (e) comprises causing the accounting software application to process the payment of the invoice identified by the unique invoice identifier using the modified payment method.

12. The method of claim 1:
wherein (c) comprises displaying a user interface element for initiating the payment of the invoice identified by the unique invoice identifier; and
wherein (d) comprises receiving, from the user, a selection of the user interface element for initiating the payment of the invoice identified by the unique invoice identifier.

13. The method of claim 12, wherein the user interface element for initiating the payment of the invoice identified by the unique invoice identifier comprises a button.

14. The method of claim 1, wherein (e) comprises providing a request to the accounting software application to record the payment of the invoice identified by the unique invoice identifier, and wherein the request comprises the unique invoice identifier.

15. The method of claim 1:
wherein (c) comprises displaying a user interface element for initiating the payments of the multiple invoices; and
wherein (f) comprises receiving, from the user, a selection of the user interface element for initiating the payments of the multiple invoices.

16. The method of claim 15, wherein the user interface element for initiating the payments of the multiple invoices comprises a button.

17. A system comprising at least one non-transitory computer-readable medium having computer program instructions stored thereon, the computer program instructions being executable to perform a method for managing outstanding invoices in an accounting software application, the method comprising:
(a) analyzing a current web page displayed by a web browser to identify a unique invoice identifier, comprising analyzing a URL of the current web page to identify the unique invoice identifier;
(b) obtaining, from the accounting software application, additional information about an invoice identified by the unique invoice identifier;
(c) causing the web browser to display the additional information about the invoice;
(d) receiving, from a user, an instruction to pay the invoice identified by the unique invoice identifier; and
(e) in response to receiving the instruction to pay the invoice identified by the unique invoice identifier, causing the accounting software application to record a payment of the invoice identified by the unique invoice identifier.

18. A computer-implemented method for managing outstanding invoices in an accounting software application, the method comprising:
(a) analyzing a current web page displayed by a web browser to identify a unique customer identifier, comprising analyzing a URL of the current web page to identify the unique customer identifier;
(b) obtaining, from the accounting software application, additional information about a customer identified by the unique customer identifier, the additional information including information about a plurality of open invoices of the customer;
(c) causing the web browser to display the additional information about the customer, including the additional information about the plurality of open invoices of the customer;
(d) receiving, from a user, a selection of multiple invoices within the plurality of open invoices of the customer;
(e) receiving, from the user, an instruction to pay the multiple invoices; and
(f) in response to receiving the instruction to pay the multiple invoices, causing the accounting software application to record payments of the multiple invoices.

19. The method of claim 18, wherein (a) comprises analyzing the URL of the current web page to identify the unique customer identifier within the URL of the current web page based on a predetermined pattern associated with the accounting software application.

20. The method of claim 18, wherein (a) comprises analyzing a user interface element of the current web page to identify the unique customer identifier.

21. The method of claim 18, wherein (a), (b), (c), (d), (e), and (f) are performed by a plugin installed in the web browser.

22. The method of claim 18, wherein the additional information includes at least one of customer details, invoice amount, invoice due date, and invoice payment status of each of the plurality of open invoices of the customer.

23. The method of claim 18, wherein (b) comprises making a request to the accounting software application via an Application Program Interface (API) and receiving the additional information via the API.

24. The method of claim 23, wherein the request includes the unique customer identifier.

25. The method of claim 18:
wherein the current web page is displayed by the web browser in a first user interface element; and
wherein causing the web browser to display the additional information about the customer comprises causing the web browser to display the additional information about the customer in a second user interface element that is distinct from the first user interface element.

26. The method of claim 18:
wherein the additional information about the customer comprises information about a payment method associated with the customer; and
wherein causing the web browser to display the additional information about the customer comprises causing the web browser to display the information about the payment method associated with the customer.

27. The method of claim 26, further comprising, before (e):
(g) receiving, from the user, an instruction to modify the payment method associated with the customer, thereby producing a modified payment method associated with the customer; and
wherein (f) comprises causing the accounting software application to record the payments of the multiple invoices using the modified payment method.

28. A system comprising at least one non-transitory computer-readable medium having computer program instructions stored thereon, the computer program instructions being executable to perform a method for managing outstanding invoices in an accounting software application, the method comprising:
(a) analyzing a current web page displayed by a web browser to identify a unique customer identifier, comprising analyzing a URL of the current web page to identify the unique customer identifier;
(b) obtaining, from the accounting software application, additional information about a customer identified by the unique customer identifier, the additional information including information about a plurality of open invoices of the customer;
(c) causing the web browser to display the additional information about the customer, including the additional information about the plurality of open invoices of the customer;
(d) receiving, from a user, a selection of multiple invoices within the plurality of open invoices of the customer;
(e) receiving, from the user, an instruction to pay the multiple invoices; and
(f) in response to receiving the instruction to pay the multiple invoices, causing the accounting software application to record payments of the multiple invoices.

* * * * *